(12) United States Patent
Tomkow

(10) Patent No.: US 9,590,951 B2
(45) Date of Patent: Mar. 7, 2017

(54) ONE-TIME PAD COMMUNICATIONS NETWORK

(71) Applicant: Robert John Tomkow, Los Angeles, CA (US)

(72) Inventor: Terrance A. Tomkow, Los Angeles, CA (US)

(73) Assignee: Robert John Tomkow, Los Angeles, CA (US)

( * ) Notice: Subject to any disclaimer, the term of this patent is extended or adjusted under 35 U.S.C. 154(b) by 14 days.

(21) Appl. No.: 14/271,426

(22) Filed: May 6, 2014

(65) Prior Publication Data

US 2014/0337615 A1    Nov. 13, 2014

Related U.S. Application Data

(60) Provisional application No. 61/820,602, filed on May 7, 2013.

(51) Int. Cl.
| | |
|---|---|
| *H04L 29/06* | (2006.01) |
| *H04L 9/06* | (2006.01) |
| *G06F 21/60* | (2013.01) |
| *H04W 12/04* | (2009.01) |

(52) U.S. Cl.
CPC ........ *H04L 63/0428* (2013.01); *H04L 9/0656* (2013.01); *H04L 63/0464* (2013.01); *G06F 21/602* (2013.01); *H04L 9/0618* (2013.01); *H04W 12/04* (2013.01)

(58) Field of Classification Search
CPC ... H04L 9/0656; H04L 9/0863; H04L 9/3231; H04L 63/067; H04L 63/0838; H04L 63/0428; H04L 2209/24; H04L 9/0618; H04L 63/0464; G06F 21/602; H04W 12/04

See application file for complete search history.

(56) References Cited

U.S. PATENT DOCUMENTS

| | | | |
|---|---|---|---|
| 2003/0026429 A1* | 2/2003 | Hammersmith ...... | H04L 9/0822 380/277 |
| 2006/0075228 A1* | 4/2006 | Black ................. | H04L 63/0428 713/167 |
| 2008/0031456 A1* | 2/2008 | Harrison ............... | H04L 9/0852 380/278 |
| 2011/0213700 A1* | 9/2011 | Sant'Anselmo ....... | G06Q 10/10 705/39 |
| 2012/0134495 A1 | 5/2012 | Liu | |

* cited by examiner

*Primary Examiner* — Jung Kim
*Assistant Examiner* — Carlos M De Jesus Lassala
(74) *Attorney, Agent, or Firm* — Rutan & Tucker LLP; John K. Fitzgerald

(57) ABSTRACT

A system and method for providing secure and anonymous communication between a plurality of individuals relying on the cryptographic method of the one-time pad (OTP) is described. Unique, randomly generated blocks of data are generated to serve as one-time pads, and each is given a unique identification that serves as a system address. One-time pads are anonymously distributed to communicants with a copy of each being retained by a service provider that operates a One-Time Pad Hub. Messages may be exchanged among holders of one-time pads through the Hub using the identifier addresses.

22 Claims, 10 Drawing Sheets

ONE-TIME PAD COMMUNICATIONS NETWORK

CROSS-REFERENCES TO RELATED APPLICATIONS

This application claims priority from Provisional Application No. 61/820,602, filed May 7, 2013 incorporated by reference in its entirety.

BACKGROUND

The present invention is generally directed to cryptography and more specifically directed to computer implementation of a one-time pad cryptographic scheme.

The importance of secure communication has never been greater as increasing amounts of vital business and personal data are daily transmitted by electronic means. Encryption is the core of secure communication but the cryptographic techniques most widely relied upon today may soon be rendered obsolete by technological advances. Most of those techniques rely on the fact that some mathematical operations that are so computationally difficult as to render cryptanalysis a practical impossibility. But how computationally difficult an operation may be depends upon the power of computers available and it is generally anticipated that the advent of quantum computing will make it possible to execute many cryptological calculations in much shorter time periods, rendering existing ciphers breakable in practice. When the practical applications of quantum computers are discussed, code breaking is typically among the first mentioned.

Quantum cryptography is sometimes held out as the antidote to quantum code-breaking. The hope is that the phenomenon of quantum entanglement can be used to eliminate the possibility of third party eavesdropping. The problem is that while quantum computing is proceeding to practical reality very quickly, progress in the long distance, reliable entanglement required for quantum cryptography is proceeding very slowly. Moreover, even when Quantum cryptography is ready for practical use, deploying the technology will likely require a massive new communication infrastructure. So, while the first quantum computers have already be sold commercially, the prospects for practical quantum cryptography seem remote.

It is possible then that we are fast approaching what might be called a "cryptographic cliff". A tipping point when, suddenly, no existing cipher method is reliably secure; a time when all the cryptographic walls we count on to protect us, come tumbling down. Private individuals will be left especially vulnerable to the early adopters of quantum computing who will likely be governments and large corporations.

However, the challenge of this new computing environment may be met by innovatively adapting one of the oldest techniques in cryptology: the one-time pad (OTP).

In OTP encryption each character from a plaintext message is encrypted to a ciphertext by a modular addition with a character from a secret random key (or pad) of the same length as the plaintext using successive characters in the pad. If the key is truly random, never reused in whole or part, and kept secret, it is demonstrably mathematically impossible to decipher the ciphertext without a copy of the pad. Because OTP encryption (sometimes called "the Vernam cipher") adds no information to the enciphered text, only random noise, it represents a perfect, unbreakable encryption method. See, Shannon, Claude (1949), "*Communication Theory of Secrecy Systems*". Bell System Technical Journal 28 (4): 656-715.

Despite its undisputed security, one-time pad cryptography faces notorious practical difficulties. First there is the problem of size and portability of storage. The pad must contain at least one character for each character that it encrypts or decrypts and each character may only be used once. The more data to be communicated, the larger the OTP must be. This problem is compounded by the number of communicants since each sender and recipient must maintain a different one-time-pad shared only between the two of them.

Another notorious vulnerability of one-time pad cryptography is the problem of the secure distribution of one-time pads: interception and copying of a pad by a third party will entirely compromise the security of the method.

To decrypt a message encrypted with an OTP it is not sufficient simply to possess a copy of that pad. It is also necessary to determine which segment of the sender's OTP was used for its encryption. If this location is not known or determinable the message will not be decipherable.

One solution to this problem would be for the sender and the recipient to each keep records of the last location the sender has used to encrypt a message and to increment these pointers by the length of each message sent and received. However a danger with this method is that the sender's record and the recipient's record might come to diverge. This might easily happen if, for example, a transmitted message failed to reach the recipient or was is corrupted, in respect of its length, en route. In that case the recipient's pointer would not be advanced and would fall out of synchronization with the sender's pointer; hence decryption of all subsequent messages would fail.

The inventor of US Patent Application 20100246811 discloses a method of using one-time pads to support a system of login passwords. In that invention a Service and its users possess one-time pads for the purpose of authenticating users to the system. The user and the Service retain a copy of a pad; to login in the user's system looks up a locally stored pointer into the one-time pad and transmits a sequence of the data it finds there to the Service. The Service looks up its own recorded pointer into its copy of the OTP pad and compares that to the transmitted sequence. If the sequences match the user is logged in and both the user and the Service must increment their records to point to a new location in the pad. The problems of synchronization with this method are clear. If the user's pointer and the systems should become out of synch it will be impossible for the user to log in.

What has been needed, and heretofore unavailable, is a system and method for providing secure and anonymous communication between a plurality of individuals. Such a system and method should be robust and unbreakable, even using quantum computers and appropriate software and techniques. The system and method should also provide for synchronization of the one-time pads of both the sender and recipient, and provide for refilling of the one-time pads when they are consumed through use. The present invention satisfies these, and other needs.

SUMMARY OF THE INVENTION

In its most general aspect, the present invention includes a system and method for implementing a one-time pad technique of encrypting and decrypting information, data and/or content contained in an electronic message. In one alternative aspect, a secure memory device includes software for implementation of the encryption and decryption of electronic message data and also includes data defining a one-time pad. A server may be used to process the electronic message data and transmit the encrypted data to a user. The server may also store the encrypted information for later access by authorized recipients. The server may also operate to synchronize the one-time pads of senders and recipients, as well as to refill one-time pad databases on secure memory devices when the data defining the one-time pad has been consumed.

In another general aspect, the present invention overcomes the traditional problem of OTP size. Current forms of electronic memory allow the storage of many gigabytes of data on devices smaller than a thumbnail. Small inexpensive high capacity storage devices—in the form of USB "thumb drives", Secure Digital and "Flash Memory" cards—are commonplace. At a very small cost per encrypted byte, one of these devices could provide for many thousands of secure messages and simply be discarded once its data had been consumed by cryptographic operations.

In another general aspect of the present invention, the need for a different pad for each recipient can be removed by routing messages through a central OTP Hub which retains copies of each communicant's unique pad. This means each user needs only one pad because each user only directly communicates with the Hub.

In a further aspect of the present invention, the use of a centralized OTP Hub also operates to resolve the problem of insecure distribution.

In still another aspect, the present invention includes a system for encrypting and decrypting information contained within an electronic message using a one-time pad, comprising: a means of detecting a OTP Address included on a SD car and using the address as the sender's address on an outbound message; an internet address of an OTP Service and means to alter this address and add alternative addresses; a means of storing a pointer to a position in OTP data stored in an OTP database, the OTP data having a beginning location, the position in the OTP data being the location of the beginning of that portion of the OTP which has not yet been used to encrypt any outbound message or password; a means of determining which portions of the OTP may be used to encrypt outbound messages and which are reserved for the decryption of inbound messages; a means of calculating the amount of available encryption data remaining on the OTP; a text editor to compose outbound messages and the ability to select files on the users local disk to be transmitted as attachments to the message; a means of addressing outbound messages to a plurality of OTP addresses; a means of saving OTP addresses together with other identifications of addressees provided by the user or extracted from received messages; a means of assigning a subject to an OTP message; a means of directing the system to encrypt the message and message data in the form of an OTP outbound message; a means of uploading and downloading messages to and from the OTP Hub system in accordance with the OTP message protocol; a means of directing the system to use a particular directory on the user's system to store received messages; a means of directing the system to use a particular directory on the user's system to store outbound messages; a means of directing the system to communicate with the OTP Service to upload and download messages; a means of listing received OTP messages providing information at least as to their subject, sender and time received; a means of deleting received files including the step of erasing that portion of the OTP used in their decryption; a means viewing the unencrypted text, sender, subject and attached file names of received attachments; a means of viewing by means internal to the application at least some form of attachments in received message; a means of saving messages and their attachments in unencrypted form to the user's system (if not marked "eyes only"); a means of marking messages as "eyes only" which instructs recipient applications not to allow the message to be saved in unencrypted form; a means of performing, for any of its data or file erasures, military grade data sanitization methods; and a means of performing all of the above operations without utilizing any form of temporary files or caching which might inadvertently leave unencrypted message information on the recipient's computer.

In another aspect, the present invention includes a system for encrypting and decrypting information content contained in an electronic message, comprising: a secure memory device having a memory in which is stored software for implementing one or more operations related to encrypting or decrypting an electronic message utilizing a one-time pad, the memory also having stored therein data defining a location in a one-time pad related to the secure memory; a server remote from the secure memory device, but in communication with the secure memory device, the server programmed by appropriate software commands to carry out the functions of an OTP service.

In yet another aspect, a method and device for providing secure and anonymous communication between a plurality of individuals relying on the cryptographic method of the one-time pad (OTP) is described. Unique, randomly generated blocks of data are generated to serve as one-time pads. Each is given a unique identification that will serve as a system address. Pads are anonymously distributed to communicants with a copy of each being retained by a service provider that operates a One-Time Pad Communications Hub. Messages may be exchanged among holders of pads through the Hub using the identifier addresses. To send a message, the sender encrypts the message and the identifiers of its intended recipients using a portion of the sender's one-time pad data. The encrypted message is then transmitted to the Hub together with the sender's unencrypted identifier. At the Hub the service holds a copy of every distributed one-time pad and its associated identifier. On receipt of the message at the Hub the service decrypts the message using the service's copy of the sender's one-time pad and re-encrypts the message for each destination using the service's copy of each destination's pad. These re-encrypted messages are then made available for download by users who poll the Hub and identify themselves by their address. Numerous methods and techniques for optimizing the efficiency and security of these operations are also disclosed.

In still another aspect, the present invention includes a system for encrypting and decrypting information contained within an electronic message using a one-time pad, comprising: a program delivery device, the program delivery device including software configured to control a processor to detect a OTP Address and using the address as a sender's address on an outbound message, detect an internet address of an OTP Service, to alter the internet address of the OTP Service and add alternative addresses, store a pointer to a position in a one-time pad (OTP) stored in an OTP database, the OTP having a beginning location, the position in the OTP being the location of the beginning of that portion of the OTP which has not yet been used to encrypt any outbound message or password, determine which portions of the OTP may be used to encrypt outbound messages and which are reserved for the decryption of inbound messages, calculate an amount of available encryption data remaining on the OTP, enable a text editor to compose outbound messages and to select files on the users local disk to be transmitted as attachments to the message, address outbound messages to OTP addresses, save OTP addresses together with other identifications of addressees provided by the user or extracted from received messages, assign a subject to an OTP message, encrypt the message and message data in the form of an OTP outbound message, and upload and download messages to and from the OTP Hub system in accordance with an OTP message protocol.

In another aspect, processor is programmed to store outbound and received messages in a memory in communication with the processor, and in some alternatives, the memory is located on the user's device. In still another aspect, the program delivery device is configured to communicate with a user's device. In another alternative aspect, the processor is programmed to use a particular directory on the user's device to store outbound messages.

In still another aspect, the processor is programmed to delete received messages and erasing that portion of the OTP used in the decryption of the received messages. In another aspect, the processor is programmed to provide for viewing the unencrypted text, sender, subject and attached file names of attachments included in received messages.

In a further aspect, the processor is configured to store a message and its attachment(s) in unencrypted form to a memory associated with the user's device if the message not marked "eyes only". In still another aspect, the processor may be programmed to perform its operations without utilizing any form of temporary files or caching.

In yet another aspect, the invention includes a method for encrypting and transmitting messages from senders to recipients employing one-time pad encryption, comprising: creating sets of true random data, each set being unique, and each set forming a one-time pad; storing one copy of each data set in a manner accessible by a server configured as a communications OTP Hub and distributing one other copy to each sender and recipient to be used as a one-time pad encryption key; receiving a message created using a copy of a one-time pad assigned to a sender of the message at the OTP Hub, the message including an identification associated with a recipient of the message; decrypting the message at the OTP Hub using the OTP Hub's copy of the one-time pad assigned to the sender of the message; re-encrypting the message at the OTP Hub to re-encrypt the message using an OTP Hub copy of a one-time pad assigned to the recipient of the message; and transmitting the encrypted message from the OTP Hub to the recipient.

In one alternative aspect, the transmitted encrypted message is decrypted by the recipient using the recipient's one time pad. In another alternative aspect, each one-time pad includes a portion used for encrypting sent messages and a portion used for decrypting received messages. In still another aspect, the message received from the sender includes encrypted data files.

In a further aspect, the invention includes erasing the portion of an OTP Hub's copy of the one-time pad assigned to the sender used to decrypt the message received from the sender after the message is decrypted at the OTP Hub. In another aspect, the method includes erasing the portion of the OTP Hub's copy of the one-time pad assigned to the recipient used to encrypt the encrypted message transmitted to the recipient after the message is encrypted.

In another aspect, the invention, further comprises including a unique alpha-numeric number associated with each one-time-pad created. In one alternative aspect, the alpha-numeric number is used as a destination address for a holder of the copy of that one-time pad.

In still another aspect, the invention further comprises recording and storing a numeric pointer to the portion of the one-time pad assigned to the recipient which has not been used to encrypt messages for the recipient. In one alternative aspect, information delimiting that portion of the one-time pad assigned to the recipient used to encrypt the message as part of the message transmitted to the recipient is transmitted to the recipient.

In another aspect, the OTP Hub pads the encrypted message with some quantity of random or pseudo-random data before the encrypted message is transmitted to the recipient. In another aspect, the OTP Hub includes in the message a message authentication code comprising a hash or check-sum of at least some portion of the transmitted message.

In yet another aspect, the OTP Hub stores transmitted and received messages in storage devices separate from those in which the OTP Hub stores one time pads.

In still another embodiment, the encrypted message is transmitted from the OTP Hub through a server remote from the OTP Hub to relay the encrypted message to the recipient.

In yet another aspect, automatically generated messages to mask the sending and receiving activities of senders and recipients are transmitted by the OTP Hub through servers remote from the OTP Hub.

In an alternative aspect, the OTP Hub transmits to the sender an indication that the encrypted message transmitted from the OTP Hub to the recipient has been queued for download by the recipient. In another alternative aspect, the OTP Hub transmits to the sender an indication that the encrypted message transmitted from the OTP Hub to the recipient has been delivered to the recipient. In still another aspect, the OTP Hub pushes messages to recipient's message client software.

In a still further aspect, the message received from the sender includes any electronic data structure or format, including one or more video, sound, text, image, or database files.

In another aspect, the OTP Hub transmits an indication, selected from the list consisting of an that a received message is able to be decrypted and/or re-encrypted), an indication that the received message cannot be decrypted and/or encrypted, an indication that the received message has been decrypted and re-encrypted, or an indication has been made available for recipient pick up and/or transmitted to recipient, to the sender. In yet another aspect, one-time pads include a portion dedicated to system messages provided by the OTP Hub. In still another aspect, an address of an OTP Hub to be used to transmit the encrypted message to the recipient is added to the message.

In still another aspect, the OTP Hub accesses a remote database of addresses associated with recipient one-time pads and relay OTP Hubs, the remote database of addresses acting as a centralized directory of addresses that can be polled by the OTP Hub.

Other features and advantages of the invention will become apparent from the following detailed description, taken in conjunction with the accompanying drawings, which illustrate, by way of example, the features of the invention.

DETAILED DESCRIPTION OF THE PREFERRED EMBODIMENTS

Figure 1:
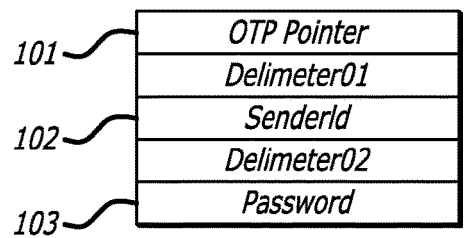
FIG. 1 depicts a message structure of one embodiment of the present invention.

In this invention, security can be achieved through ubiquity, that is, by allowing the widespread, anonymous and random distribution of many one-time pads through a variety of physical channels. If physical one-time pads in the form of thumb drives and SD cards were sold in a variety of retail outlets and mail order services through which users could anonymously and unpredictably purchase them, it would be virtually impossible for a bad actor to know which pad will reach the hands of the communicants on whom he wishes to spy. Users of the system need never exchange one-time pads directly or know how or when other uses acquired their pads.

The use of a central system further makes it impossible for a bad actor to know which users of this system were communicating with one another. This is because it can be made impossible, by encryption, for any electronic eavesdropper to know to whom a message uploaded to the OTP Hub is addressed. Likewise, because the identification of the sender of a downloaded message will be encrypted, the eavesdropper could not know who sent a downloaded message.

The only information that any users of the system need to exchange in order to securely send messages through the OTP Hub is the unique identification associated with the pad of the intended recipient. This is their OTP address. Provided these addresses are securely exchanged the anonymity of their communications is insured.

Note though that anonymity is not the same thing as security. It would be possible, using the system here disclosed, for an individual to make his or her OTP address public so that any other user of the system could transmit messages to him or her. Messages could still be transmitted to this publicized address with complete security and, from the sender's point of view, complete anonymity since it would remain impossible for any eavesdropper on the communication channel to determine the content of these messages or the identity of the sender.

The security of any OTP system relies on how securely OTP's are held. For an individual user this requires insuring the physical and electronic security of their personal OTP. This is made easier for users by the fact that the OTP itself will be a small discreet device that can be easily decoupled from the user's computer system when not in use.

In the methods here disclosed security is further enhanced by storing received and outbound messages separately from the OTP data itself and always in encrypted form. This means that even if copies of these messages should fall into wrong hands they will be unreadable without the device containing the OTP.

In the case of outbound messages it is also disclosed here that the application that encrypts outbound OTP messages will also erase used portions of the sender's OTP pad. Thus even if the OTP should fall into the wrong hands it would be impossible for it to be used to decrypt outbound messages that have already sent even if these had been somehow intercepted.

Additionally the application used to decrypt received OTP messages will allow the recipient of a message the option of deleting a received message while simultaneously erasing that portion of the recipient's OTP used to decrypt that message. This insures that even if the recipient's OTP should fall into the wrong hands it cannot be used to decrypt copies of messages the recipient has already deleted even if copies of these messages exist.

It is an additional benefit of the techniques disclosed here that they allow OTP applications to decrypt and display messages to recipients without at any point storing an unencrypted version of the message even temporarily. It's a requirement of the OTP application described here that, except at the users specific command, it will store no plaintext copies of received messages even in temporary files or non-volatile cache storage.

In the system and method proposed here, copies of all users' one-time pads are held by the OTP Hub system so the physical security of this system is of paramount importance to preserve the security of OTP communications. The various embodiments of the present invention comprises techniques to enhance that security.

As one of these techniques, a Hub system that performs the steps of decrypting messages from recipients and re-encrypting them for destinations within the working memory of the OTP system computer is also disclosed.

As another security feature, as soon as an encrypted outbound message has been created and stored for pickup by a recipient, the OTP Service will erase that portion of the Hub's copy of the recipient's OTP used to encrypt that message. Likewise, as soon as a message has been re-encrypted for each intended recipient, the Hub system will erase that portion of the systems copy of the sender's OTP that was used to decrypt the received message and the received message itself.

At no point is any plain text copy of the message stored on the Hub system. This means that even if the security of the Hub system were entirely compromised at any given time it would still be impossible for the bad agent to decrypt any uncollected messages then on the system or any messages that had been somehow previously intercepted en route to or from the OTP Hub.

Moreover, since the OTP Hub will hold no means of identifying any user of the system apart from their OTP address, a compromise of the OTP Hub's Security would not compromise the anonymity of OTP Service users.

To decrypt a message encrypted with an OTP it is not sufficient simply to possess a copy of that pad. It is also necessary to determine which segment of the sender's OTP was used for its encryption. If this location is not known or determinable the message will not be decipherable.

One solution to this problem would be for the sender and the recipient to each keep records of the last location the sender has used to encrypt a message and to increment these pointers by the length of each message sent and received. However a danger with this method is that the sender's record and the recipient's record might come to diverge. This might easily happen if, for example, a transmitted message failed to reach the recipient or was is corrupted, in respect of its length, en route. In that case the recipient's pointer would not be advanced and would fall out of synchronization with the sender's pointer; hence decryption of all subsequent messages would fail.

It is one of insights of the various embodiments of the present invention that this problem can be resolved by having each agent that encrypts a message, whether this is the original sender or the OTP Hub Service, include, in plain text, as part of the OTP message, a pointer to the location in the OTP where encryption begins. Since this pointer is of no value in decrypting the message for anyone not in possession of a copy of the OTP it can be transmitted in plain text without compromising the security of the message itself.

Further if each OTP used in the system is split or segregated into a portion to be used for encryption and a portion to be used for decryption then only the transmitter of the OTP message needs to preserve a record of the location in the OTP used to encrypt outbound messages. In this method each recipient of an OTP message also receives, in plain text, a pointer into their own OTP at which the messages decryption is to begin so there is no possibility of sender and recipient falling out of synchronization. Since only the OTP Service ever encrypts messages delivered to users there is no danger of different senders consuming the same portion of the recipient's OTP.

The problem of synchronization and the merits of the solution here disclosed are illustrated in the problem of permitting users to securely login and use the Hub system. Since messages downloaded from the OTP system cannot be decrypted by anyone not possessing the right OTP, the security of messages is not compromised if someone impersonating a valid OTP address should manage to download a message queued for that address. However, since the system will erase copies of messages that have been successfully downloaded such an impersonation would mean that the true holder of that OTP address will never receive that message. As such, the next message downloaded by the true holder of the OTP Address would need to direct the recipient OT pad where to start the decryption process; hence the need for the OTP Hub to send the pointer information to the recipient's OTP with each OTP Message.

Similarly, while no one can successfully transmit a message through the OTP Service unless they possess a valid OTP address, precautions must be taken against impersonators who might trick the system into attempting to decrypt and re-encrypt the message on behalf of authentic OTP users and recipients. Since the system erases portions of the sender's OTP each time it receives messages from his or her address, this could mistakenly consume portions of that OTP making it impossible for the legitimate sender to upload messages. Other denial of Service (DOS) attacks might be possible without some means of authenticating uploaders and downloaders of OTP messages as bona fide holders of the OTPs corresponding to OTP addresses.

The inventor of US Patent Application 2010/0246811 discloses a method of using one-time pads to support a system of login passwords. In that invention a Service and its users possess one-time pads for the purpose of authenticating users to the system. The user and the Service retain a copy of a pad; to login in the user's system looks up a locally stored pointer into the one-time pad and transmits a sequence of the data it finds there to the Service. The Service looks up its own recorded pointer into its copy of the OTP pad and compares that to the transmitted sequence. If the sequences match the user is logged in and both the user and the Service must increment their records to point to a new location in the pad. The problems of synchronization with this method are clear. If the user's pointer and the systems should become out of synch it will be impossible for the user to log in.

In the current invention this problem is resolved by exploiting techniques already disclosed. To upload a message to the OTP system the sender transmits a login message which comprises the sender's OTP address, a sequence of character's from the sender's OTP and a pointer to the location from which the sequence is drawn. The structure of such a message is exhibited in FIG. 1. The OTP Service authenticates the login message by examining the pointed to location in the OTP pad identified with that OTP address to determine if the transmitted sequence matches the sequence there. If the sequence matches, the user is logged in. The sender then increments a locally stored copy of a pointer into the One-time Pad. The OTP Service need retain no record of this pointer.

As a further security measure it will be seen (FIGS. 5 & 8) that all OTP messages may include a message authentication code (MAC) which may contain a hash or checksum augmented with secret bytes dawn from the sender's OTP pad. This allows the message recipient to determine if any message has been corrupted or tampered with en-route.

In one embodiment, the OTP Service provider creates OTP's in the form of portable storage devices (SD) each containing a unique block of true random numbers, a software application and a short alphanumeric string which is unique to each device and which serves as the OTP address of this device. Users may purchase these SDs at retail stores or through the mails. Ideally SD's may be packaged using methods used for commercial drugs or foodstuffs to render the packages indicative of tampering. The packaging of SD's would display no indications that would allow distributors to associate buyers with SDs, thus preserving the anonymity of the buyer.

It will be understood that the SD may take several forms, such as, but not limited to a device having a memory in which is stored the aforementioned software application, identification string and block of random numbers. In some embodiments, the SD may take the form of a device such as a flash drive, thumb drive or other portable memory device. In other embodiments, the SD may include a processor and an associated memory, the processor capably of operating under control of the software application to provide the functions of the system of the present invention. In some embodiments, the SD may be put in communication with a user's computer, tablet, smartphone or other such device, and the software application and other data stored in the memory of the SD are accessed by the processor of the user's device. In other embodiments, the software application may be programmed to execute, using either a processor of the SD, or the processor of the user's device, in a self-starting manner when the SD is connected to the user's device.

The software application included in the SD, which is implemented by a series of programming commands designed to be carried out by a processor, provides the user with an interface presenting, in many respects, the functionality of a conventional email client. This functionality includes, for example, but not limited to: detecting the OTP Address included on the SD and using said address as the sender's address on outbound messages, detecting an internet address of the OTP Service and a function or subprogram for altering this address and for adding alternative addresses, storing a pointer to a position in the OTP data which is the location of the beginning of that portion of the OTP which has not yet been used to encrypt any outbound message or password, determining which portions of the OTP may be used to encrypt outbound messages and which are reserved for the decryption of inbound messages, calculating the amount of available encryption data remaining on the OTP.

In some embodiments, the software application may include functions configured to operate as a text editor to compose outbound messages and the ability to select files on the users local disk to be transmitted as attachments to the message, to address outbound messages to a plurality of OTP addresses, to save OTP addresses together with other identifications of addressees provided by the user or extracted from received messages, and to assign a subject to an OTP message.

In other embodiments, the software application may be programmed to control the system to encrypt the message and message data in the form of an OTP outbound message (FIG. 5), to upload and download messages to and from the OTP Hub system in accordance with the OTP message protocol, to control the system to use a particular directory on the user's system to store received messages, to control the system to use a particular directory on the user's system to store outbound messages, to control the system to communicate with the OTP Service to upload and download messages, to list received OTP messages providing information at least as to their subject, sender and time received, to delete received files including the step of erasing that portion of the OTP used in their decryption.

In still other embodiments, the software application may be programmed to control the system view the unencrypted text, sender, subject and attached file names of received attachments, to view by means internal to the application at least some form of attachments in received message, to save messages and their attachments in unencrypted form to the user's system (if not marked "eyes only"), to mark messages as "eyes only" which instructs recipient applications not to allow the message to be saved in unencrypted form, to perform, for any of its data or file erasures, military grade data sanitization methods (e.g. DoD 5220.22-M), and to perform all of the above operations without utilizing any form of temporary files or caching which might inadvertently leave unencrypted message information on the recipient's computer. Those skilled in the art will understand that the various embodiments of the system and method of the present invention may perform all of the above named functions, or some subset of those functions, in any combination, and still be within the intended scope of the invention.

Figure 2:
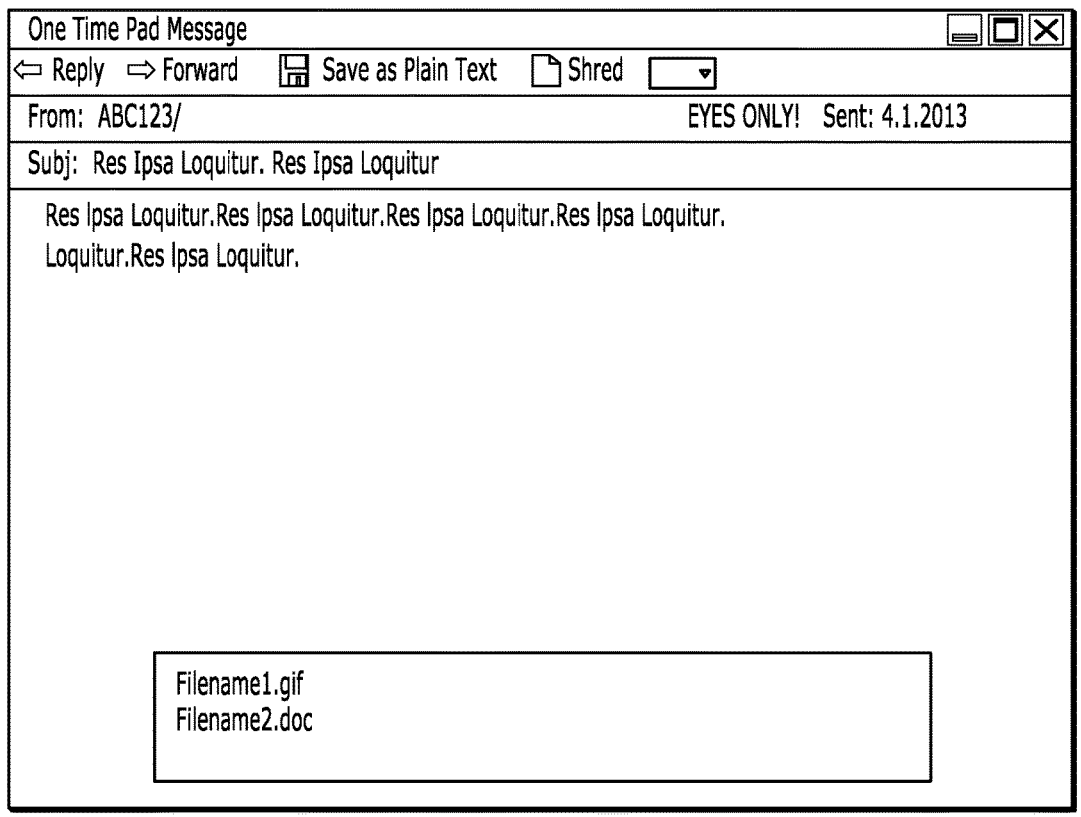
FIG. 2 is a graphical representation of a screen that is part of a graphical user interface of one embodiment of the present invention showing a main page where information about received messages is displayed.
Figure 3:
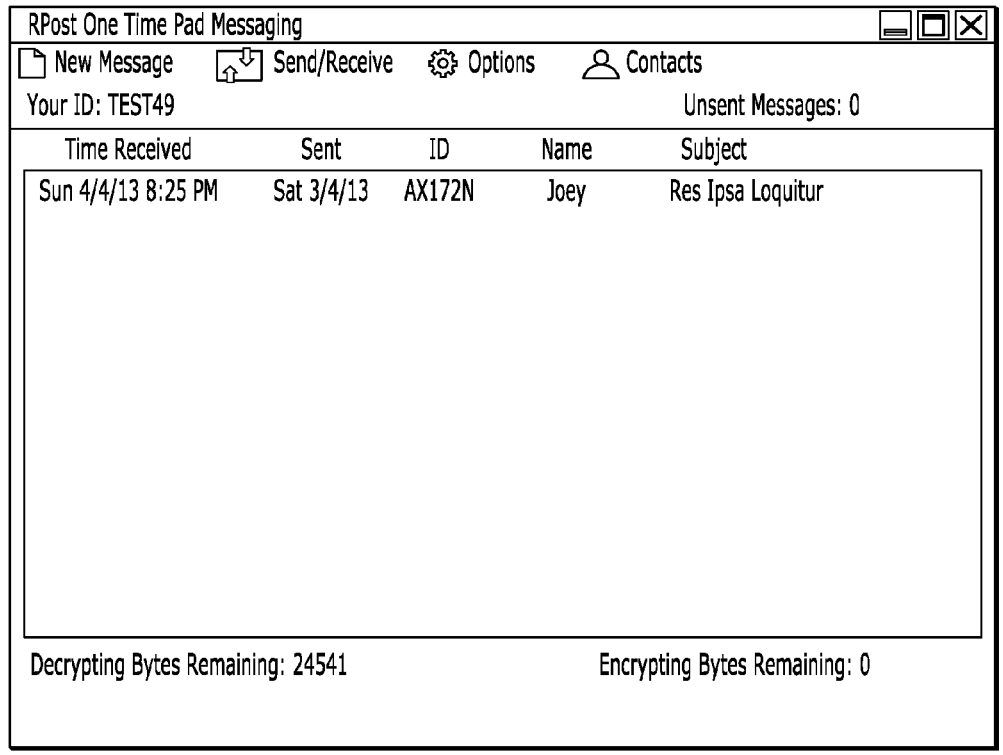
FIG. 3 is a graphical representation of a screen that is part of a graphical user interface of one embodiment of the present invention showing a compose page for creation of an outbound message.

FIGS. 2 and 3 illustrate portions of an exemplary graphical user interface that might be presented by such an application. FIG. 2 shows the applications main page where information about received messages is displayed. FIG. 3 illustrates a compose page for the creation of outbound messages.

Figure 4:
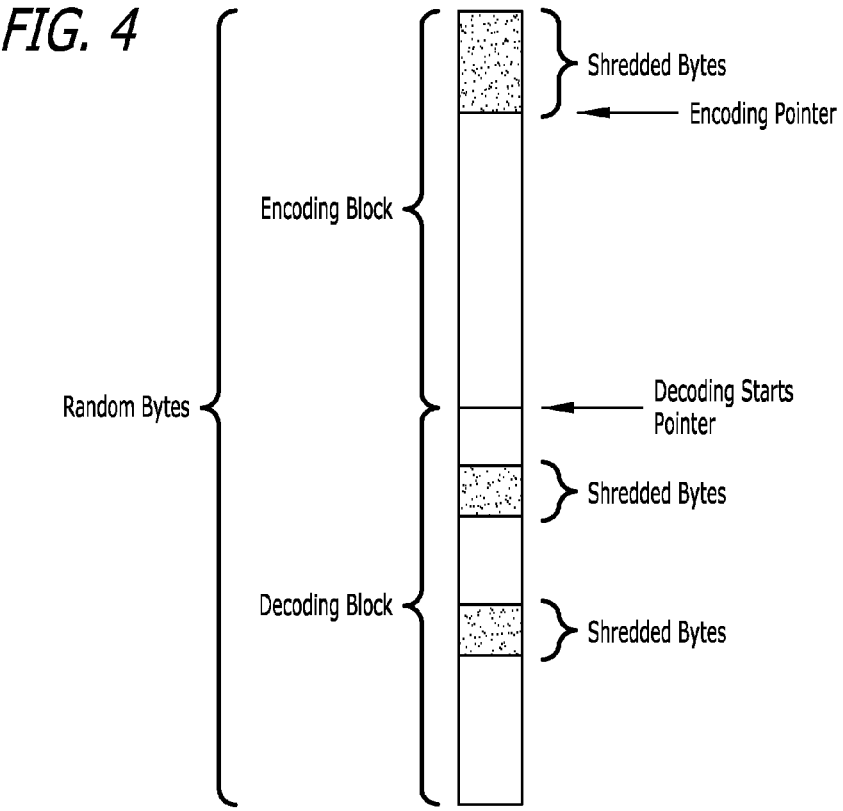
FIG. 4 is a graphical representation of a structure of a data block comprising OTP data in accordance with one embodiment of the present invention.

FIG. 4 illustrates one embodiment of a structure for the data block that comprises OTP data. Initially OTP data is a set of non-zero bytes generated by a process known to be genuinely random, for example, by an independently certified quantum randomizer.

In one embodiment, OTP data is partitioned into two blocks; one that will be used to encrypt outbound data and a portion that may be used to decrypt inbound. The OTP application records and maintains a value as the encoding pointer which is the location in the OTP data of the next byte that may be used to encrypt outbound data. The encoding pointer initially points to the first byte of the encoding portion of the OTP and is incremented whenever a byte is used to encrypt a byte of outbound data. The application also records a value which is that location in the OTP which ends the encoding portion of the OTP. In an alternative embodiment the encoding and decoding data blocks might be separate files stored in the memory of the SD.

After the user has composed a message on the OTP application and directed that the message be sent, the application will first calculate the message's size to determine if there are sufficient unused encoding bytes available on the OTP to encrypt the message. If not, the user will be given a warning message and no message will be sent.

Figure 5:
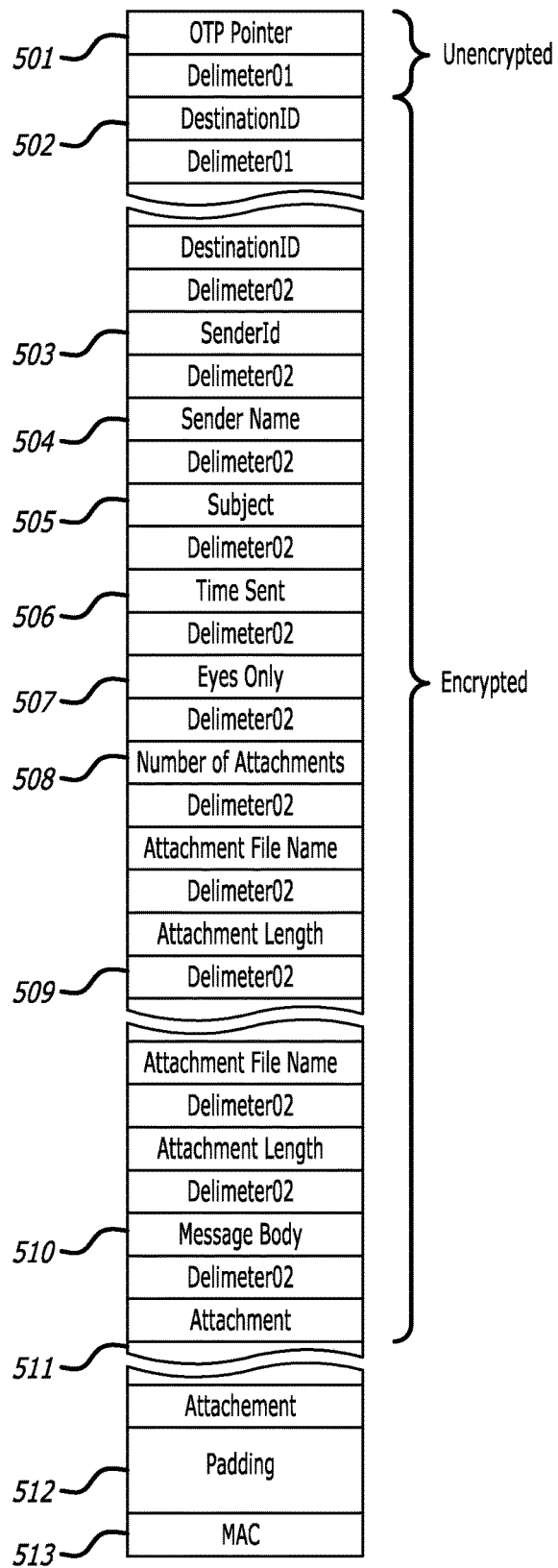
FIG. 5 is a graphical representation of a structure of a data block of an outbound OTP message in accordance with one embodiment of the present invention.

If there are sufficient encoding data contained in the memory block of the OT pad, the application will construct an OTP outbound Message. The structure of a typical outbound OTP message is depicted in FIG. 5 comprises, for example:

a representation of the value of the OTP encoding Pointer at the beginning of the encryption operation in segment 501;

a series of null delimited string representations of OTP Addresses in segment 502;

the OTP Address of the sender's OTP Pad in segment 503;

the name or "handle" the sender chooses to identify herself or himself to recipients for the purposes of OTP communications in segment 504;

the subject of the message in segment 505;

a string representation of the time the message was consigned for sending in segment 506;

a Boolean value indicating if the message should be treated as "eyes only" by the recipient; In other implementations this value might also indicate other forms of special handling the Service might provide in segment 507;

a string representation of the number of files attached to the message in segment 508;

a series of filenames of the attached messages followed by the lengths of those files in segment 509;

the text body of the message in segment 510;

a series of appended files in the number of the value contained in segment 508 in the order listed in segment 509 stored in segment 511;

padding data of arbitrary and varying length comprising random or pseudo random numbers in segment 512; and a Message Authentication Code comprising a hash of the entire message including padding conjoined with a plurality of bytes drawn from the beginning of the portion of the OTP used for the encryption of the message in segment 513. While the above segments have been described in a particular order, that order is not necessary to the proper functioning of the system and method of the invention. The segments could be stored in a different order, provided that the software application is programmed to detect the order of the segments, and then use or extract the date contained in those segments to carry out features and functions of the present invention.

Each of segments 501-510 is generally delimited by binary control characters that will enable parsing by message recipient's software application. The Padding data contained in segment 512 may be of varying and randomly determined length and is associated with each OTP message. This is added to prevent an eavesdropper from trying to match messages uploaded to the system with messages downloaded from the system by comparing lengths. Padding insures that the length of an uploaded message will not match its downloaded length and hence foils this method of tracing message flow.

Each byte of the data comprising segments 502-511, 1 including delimiters are byte wise encrypted by performing a logical exclusive disjunction (XOR) of the message byte with a byte from the OTP. When the message has been encrypted and written to the application's outbound folder the application will save value of the incremented encoding pointer.

At user determined intervals, the software application connects through the Internet or some other network or communication system to the OTP Service and log in. To log in the software application creates an OTP login message including, the elements of FIG. 1, for example, comprising: the current OTP decode pointer in segment 101; the sender's OTP address in segment 102; a sequence of bytes drawn from the OTP at the address of segment 101 which will serve as a single use password in segment 103.

Figure 6:
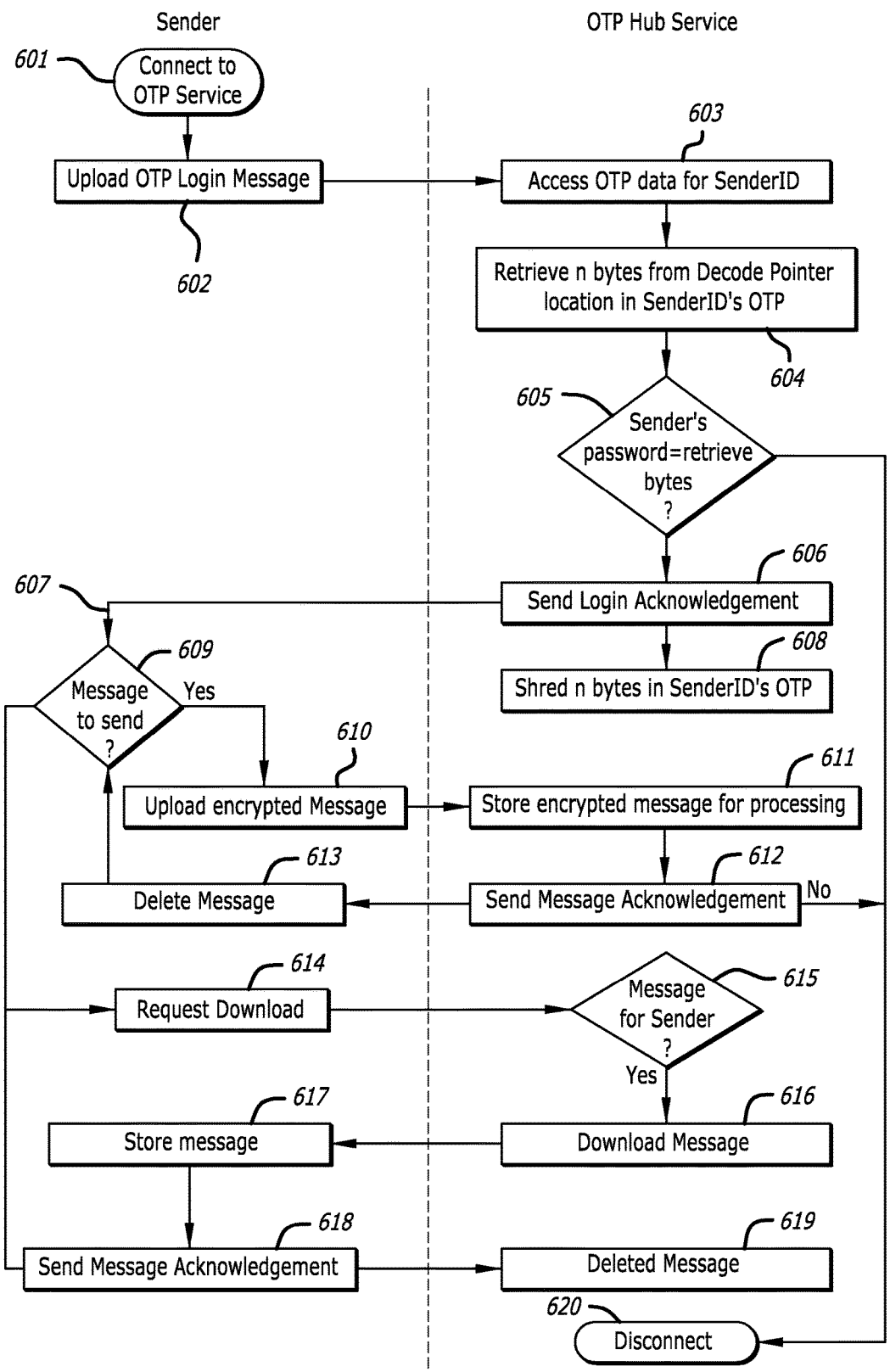
FIG. 6 is a flow chart illustrating an OTP communication protocol in accordance with one embodiment of the present invention.

The software application then uploads and downloads messages in accordance with the OTP communications protocol depicted in FIG. 6. As illustrated in FIG. 6, the sender's software application connects to the Internet address of the OTP Service at box 601 and uploads an OTP login message (FIG. 1) to the OTP Service at box 602. Upon receiving the login message the processor or server of the OTP Service determines the OTP address of the nominal sender and accesses the Service's copy of the OTP stored for that address in box 603. Using the data pointer included in the login message the Service compares bytes in the password portion of the login message with bytes in the OTP in box 605. If this comparison fails, the Service closes the connection in box 620. If the transmitted login bytes match, the OTP Service sends an acknowledgement to the sender in box 606 and deletes the password bytes from the Service's copy of the sender's OTP in box 608.

Upon receipt of the login acknowledgment from the OTP service at box 607, the sender's software application determines if there is a message for upload in the sender's outbox directory at box 609. If so, the software application uploads the message to the OTP Hub Service at box 610. No special secured line or secure transport protocol is required for this transmission since the message cannot be decrypted except by the Service.

Upon completing the upload of the message the OTP Service stores the uploaded message for further processing at box 611. The message will be stored with a record associating the received message with the address of the sender either in a database or by incorporating the address in a filename. The Service then sends an acknowledgment to the sender at box 612. Upon receipt of the acknowledgement, the sender's software application deletes the sender's local copy of the encrypted message at box 613. The software application then uploads the next outbound message.

After the sender's software application has uploaded all outbound messages in the sender's outbox, the sender's software application sends a request to the OTP Hub Service to download any messages queued for the sender's address at box 614. The OTP Hub Service determines if there is a message pending for the sender's address at box 615 and, if there is, download the message to the sender at box 616. Having downloaded the message, the sender's software application stores the downloaded message in a memory associated with the software application (or in a memory of a user's device) in box 617 and sends an acknowledgment to the OTP Hub Service in box 618. When the OTP Hub Service receives the sender's acknowledgment, the OTP Hub Service deletes the OTP Hub Service's copy of the encrypted message in box 619. The process is repeated until all pending messages have been downloaded, whereupon the OTP Hub Service ends the session and disconnects in box 620.

OTP Messages uploaded to the OTP Service are processed as soon as possible after they are uploaded to the Service. This processing is illustrated in FIGS. 7A-7B.

Figure 7A:
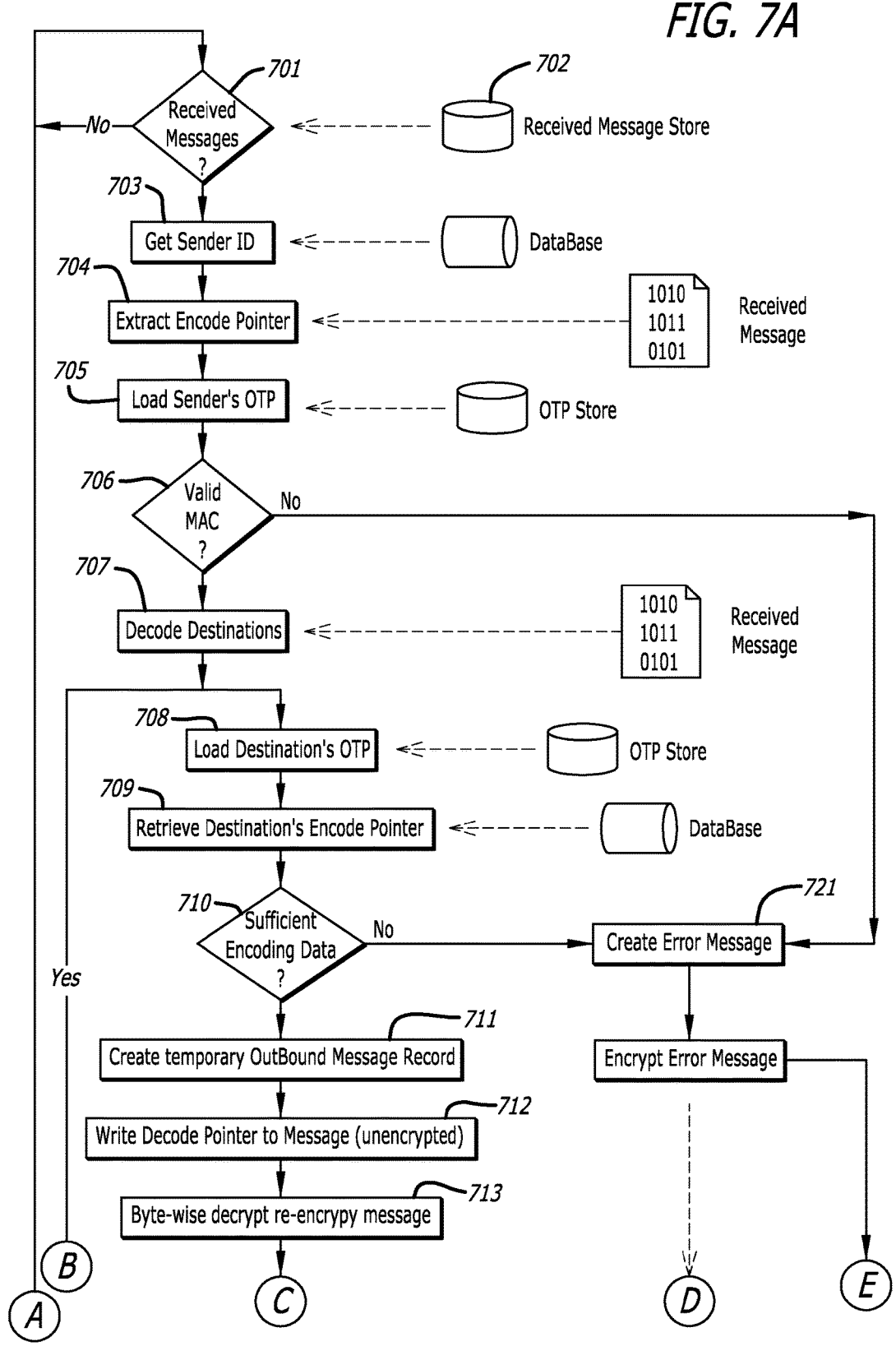
FIGS. 7A-7B is a flow chart illustrating how messages uploaded to an OTP service in accordance with one embodiment of the present invention are processed.
Figure 7B:
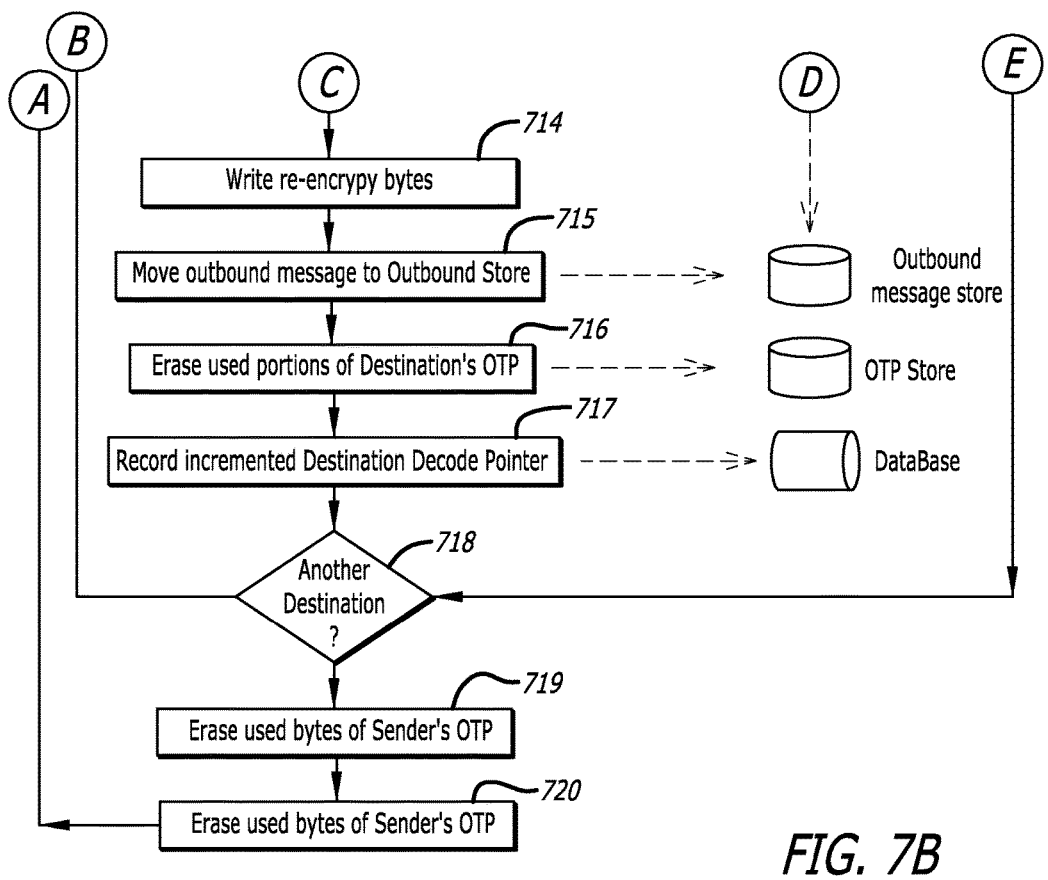

As depicted in FIGS. 7A-7B, the OTP Hub processor first determines that an encrypted message has been received in box 701 by examining the OTP Hub's store of uploaded messages in memory 702. On finding an OTP message, the system retrieves the sender ID associated with that OTP message from a database record 703 created at the time of upload. In an alternative embodiment this address was incorporated into the file name of the received message in the course of the uploading process.

Each received OTP Message has, as a header, an unencrypted expression of the integer that points to the location of the sender's OTP at which encryption of the encrypted portion of the OTP message was begun. The system extracts this pointer in box 704 and retrieves the system's copy of the OTP pad corresponding to the sender's OTP address in box 705.

Using bytes beginning at the location of the sender's OTP pad encode pointer as a secret key the system first calculates a Message Authentication Code for the received OTP Message and compare this value to the MAC transmitted with the OTP Message in box 706. If these are not identical the message will be deemed to have been corrupted in transmission. The system then generates an error message for the sender in box 721 and performs no further processing of the OTP Message.

If the OTP Message MAC address is valid, the system decodes the part of the first part of the OTP Message which contains the list of intended OTP destination addresses by sequentially applying the XOR function to each received encrypted byte and OT pad byte in box 708. The system's copy of the sender's OT pad encode pointer is incremented for each byte read and value of the pointer at the end of reading the destination list is preserved.

For each destination address included in the message the system retrieves from local storage the copy of the OT pad corresponding to that OTP address in box 709. The system retrieves the last recorded position in the recipient's pad that has been used by the system from a database to encode data for this recipient. If this is the first OTP Message this destination has received this value will point to the beginning of that portion of the OTP designated, upon creation of the pad, for use in decoding.

Having retrieved the encoding pointer and information about the size of the destination's OT pad, the system determines the size of the message to be delivered and determines if the destination possesses sufficient bytes to encrypt the outbound OTP Message in box 710. If not, the system creates an error message for the sender and the destination in box 721 containing a report of the reason for the failure to deliver the message. The creation and content of such an Error Messages is discussed in more detail below.

Figure 8:
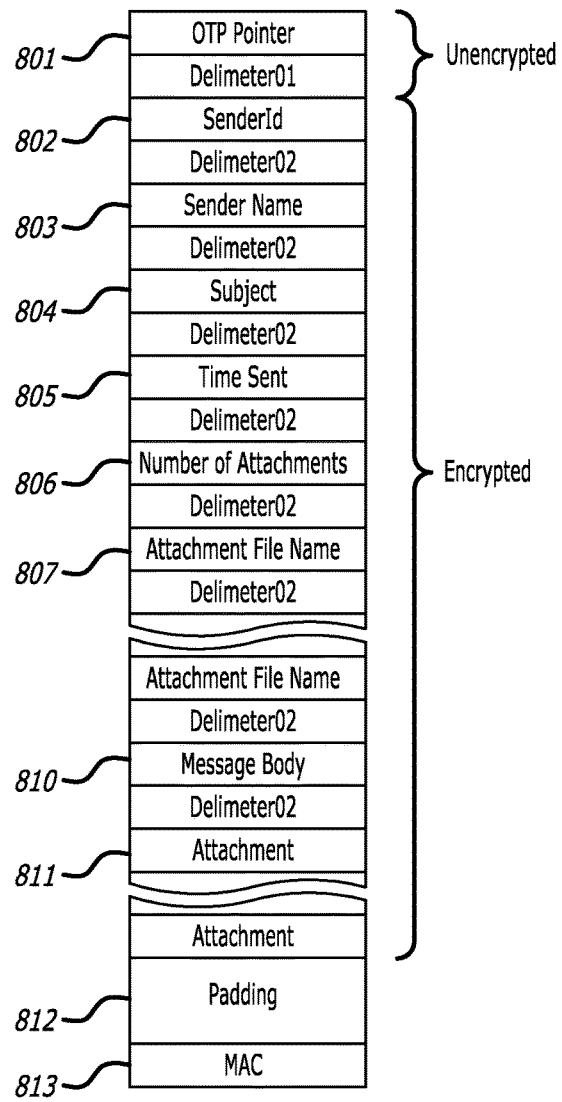
FIG. 8. is a graphical representation of a structure of a data block of a downloaded OTP message in accordance with one embodiment of the present invention.

If there is sufficient data in the destination's OT pad, the OTP Hub system will proceed to create a message in the format of a downloaded OTP Message in box 711 (See FIG. 8). As a first portion of this outbound OTP Message, the system writes an unencrypted, delimited string representation of the current value of the decoding pointer of the destination's OT pad (this is to be used in encrypting the balance of the message for subsequent destinations) in box 712. An initial fixed portion of this one-time pad data is saved for use in calculation of the outbound OTP Message MAC. The encryption pointer is advanced for each byte used. Further encryption of the outbound OTP Message is accomplished loading successive bytes from the received OTP Message, beginning at the location in the message of the sender's OTP Address identification and after the list of destinations. Each encrypted byte, e, is then exclusively disjoined with a byte, s, from the sender's OT pad at the sender's encode pointer and with a byte, d, from the destination's OT pad at the destination's decode pointer to generate a new value, o, where:

$o = e$ XOR $s$ XOR $d$

The value of o will be an encrypted representation of the plaintext byte transmitted by the sender re-encrypted with the value of the destination's OT pad. The encrypted byte o is appended to the outbound OTP Message in box 714, and the pointers are incremented to read the next byte until the end of the received OTP Message is written.

After encrypting the balance of the original message, the system strips the padding included in the received message and attaches a random number of random bytes to pad the outbound message. The system then calculates a MAC for the message using the stored secret bytes and appends it to the message before moving it to the directory or database in which outbound OTP Messages are stored for download by users in box 715. The OTP Message is stored with a record associating the OTP Message with the OTP Address of the message's destination. The system erases used portions of the destinations OT pad in box 716, and the record containing the destination decode pointer is incremented in box 717. The system then determines if there is another destination to which the OTP Message is to be sent in box 718.

Figure 12:
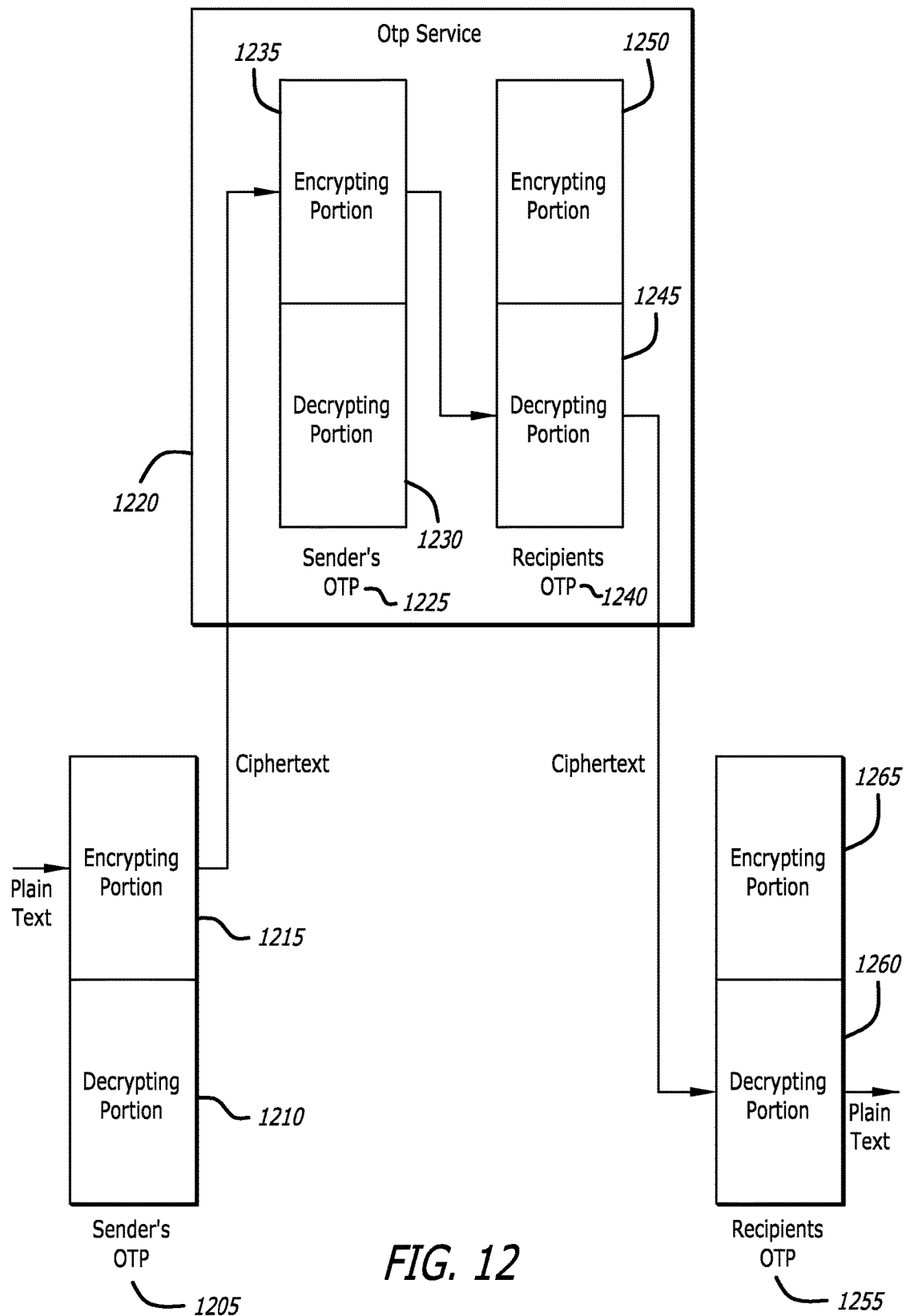
FIG. 12 is a graphical representation illustrating the location of pointers into a sender's OTP and recipient's OTP in accordance with one embodiment of the present invention.

Referring now to FIG. 12, the location of these pointers into the sender's and recipients OT pad will now be discussed. A sender has is assigned an OT pad 1205 that includes, as discussed previously, an encrypting portion 1215 and a decrypting portion 1210. When a ciphertext message is sent to OTP Hub Service 1220, the OTP Hub Service uses a copy of the sender's OT pad 1225 (that is identical to the OT pad 1205) to process the sender's OTP Message. The OTP Hub Service's sender pad 1225 also includes an encrypting portion 1235 and a decrypting portion 1230.

OTP Hub Service 1220 also includes a copy of a recipient's OT pad 1240, which is identical to an OT pad 1255 assigned to the recipient. The OTP Hub Service's copy of recipient's OT pad includes an encrypting portion 1250 and a decrypting portion 1245. Similarly, recipients OT pad 1255 includes an encrypting portion 1265 and a decrypting portion 1255.

Returning now to FIGS. 7A-7B, the system repeats steps 708-718 for each destination OTP Address in the received OTP Message. When all the destination OTP Addresses are processed the system erases those portions of the sender's OTP that were used to decrypt the received message in box 719. Finally, after the processing of any received message, the received message is erased in box 720.

At this point the only copies of the OTP Message remaining on the system are the copies queued for pick up by their addressees. Only those addressees will be able to decrypt the OTP Message since no plaintext copies of message or the one-time pad data used to encrypt it remain on the system.

As described above, all decryption and re-encryption operations performed in the system take place in the OTP Hub system's working memory and at no point is any plain text version of the message ever stored on the OTP Hub system. Once an outbound OTP Message is queued for delivery by the OTP Hub it can only be deciphered by the intended recipient.

One exemplary structure of a downloaded OTP Message, that is, the OTP Message that is sent from the OTP Hub Service to the destination address is illustrated in FIG. 8. In this exemplary structure, there is a representation of the value of the OTP Pointer at the beginning of the encryption operation in segment 801;

the OTP Address of the sender's OTP Pad in segment 802;

the name or "handle" the sender chooses to identify herself or himself to recipients for the purposes of OTP communications in segment 803;

the subject of the message in segment 804;

a string representation of the time the message was consigned for sending in segment 805;

a string representation of the number of files attached to the message in segment 806;

a series of filenames of the attached messages followed by the lengths of those files in segment 807;

the text body of the message in segment 810;

a series of appended files in the number of the value contained in segment 806 in the order listed in segment 807 stored in segment 811;

padding data of arbitrary and varying length comprising random or pseudo random numbers in segment 812; and a Message Authentication Code comprising a hash of the entire message including padding conjoined with a plurality of bytes drawn from the beginning of the portion of the OTP used for the encryption of the message in segment 813. While the above segments have been described in a particular order, that order is not necessary to the proper functioning of the system and method of the invention. The segments could be stored in a different order, provided that the software application is programmed to detect the order of the segments, and then use or extract the data contained in those segments to carry out features and functions of the present invention.

Each of segments 801-811 is generally delimited by binary control characters that will enable parsing by message recipient's software application. The Padding data contained in segment 812 may be of varying and randomly determined length and is associated with each OTP message. This is added to prevent an eavesdropper from trying to match messages uploaded to the system with messages downloaded from the system by comparing lengths. Padding insures that the length of an uploaded message will not match its downloaded length and hence foils this method of tracing message flow.

Each byte of the data comprising segments 502-511, 1 including delimiters are byte wise encrypted by performing a logical exclusive disjunction (XOR) of the message byte with a byte from the OTP. When the message has been encrypted and written to the application's outbound folder the application will save value of the incremented encoding pointer.

Though the embodiment just disclosed was described as using internet/TCIP mediated connections it will be obvious to anyone skilled in the art how the system described herein could be adapted to any form, medium or channel that permits digital communications.

Error Messages

There are several circumstances in which it may prove impossible for the OTP Hub service to deliver an OTP Message. For example, it may be that the sender has misaddressed the OTP Message and there is no OTP Address to deliver the OTP Message to. It may also happen, as noted above, that a recipient's OT pad has insufficient data left to allow the OTP Message to be encrypted. In such cases the OTP Hub system will queue an error message for download to the sender. To encrypt these error messages, the system uses the decoding portion of the OTP Hub service's stored copy of the sender's OT pad, encrypting the error message according to the OTP Hub service's stored pointer for that OT pad. This insures the security of the OTP Hub system's communication with the user.

Further, in such cases, after the OTP Hub determines the OTP Message cannot be encrypted for an intended recipient or some of the intended recipients (for example, if a plurality of recipient destinations were identified by the sender, and only some of those recipients have sufficient data left in their OT pads to encrypt the message for their later retrieval), the error message will indicate which recipient OTP Addresses could not be delivered to, the reason for such non-delivery, and upon creating the error message, the OTP Hub system will erase the unencrypted message that could not be encrypted using an intended recipient OT pad.

System Addresses

From time to time it may also happen that OTP Hub service users have reason to communicate with the operators of the OTP Hub service. For this reason the operators may make public some special OTP Addresses which are specific to the OTP Hub service available. When the OTP Hub Service receives a message addressed to one of these OTP Addresses the message is decrypted and made directly available to the operators of the OTP Hub Service.

OTP Refills

It is inherent to one-time pad cryptography that one-time pad data is consumed at a rate which matches the rate at which messages are encrypted or decrypted. Even with large capacity SD's the time will inevitably arrive when a user's one-time pad nears exhaustion. One-time pad applications will warn users of this issue in a timely manner.

It is, of course, always possible for a user to acquire a new OT pad SD and use it to send and receive OTP Messages under the address distributed with the SD. However, it may be that a user prefers to maintain his or her current OTP Address.

The following refinement of this one-time pad messaging application makes this possible. On first installation of the OTP software application included on an OT pad SD or other device, the OTP software application determines if a prior instance of the OTP software application has been installed on the user's system. If it has, the OTP software application offers the user the option of using the new OT pad data with the former OTP Address. If the user selects this option, the OTP software application composes a system message using the remains of the users old OT pad and the OTP Addresses associated with user's new and old OT pad. The system message is addressed to an OTP Hub service address (see above) and when received, will cause the OTP Hub service to associate the one-time pad data associated with the user's new OT pad with user's former OTP Address.

Alternate Channels

Tyrannical regimes have reason to fear private conversations between their subjects and outsiders. For that reason such regimes might take steps to prevent users from directly connecting to the OTP Hub service by blocking user's internet access to the OTP Hub service. It is desirable therefore that the OTP software application provide its users with alternate channels to transmit OTP Messages. Accordingly, the OTP software application may be configured or programmed to allow upload and or download through telephone modem connections, or through the use of third party social networking, email, text, IM, sms, data streaming, mms, chat communications networks, and the like.

In an alternative embodiment, the OTP Hub system might operate a system of relay stations to which OTP Messages may be addressed. OTP Messages are transmitted from these stations to the central OTP Hub for re-encryption to destination addresses. Once re-encrypted the central OTP Hub may then broadcast copies of the message to the same or a plurality of different relay stations where they may await download by recipients. Each relay server has its own one-time pad and OTP Address, and at each step of this relay the original OTP Message would be decrypted using the relay station's copy of the sender (for first OTP Hub relay server) or sending OTP Hub relay server's one time pad and re-encrypted with a one-time pad which is held at the relay station and which is duplicated only at the next destination of the relay. Original OTP Messages may be repeatedly relayed until the original OTP Message arrives at its ultimate destination where it may be decrypted by a pad held by the recipient.

Figure 9:
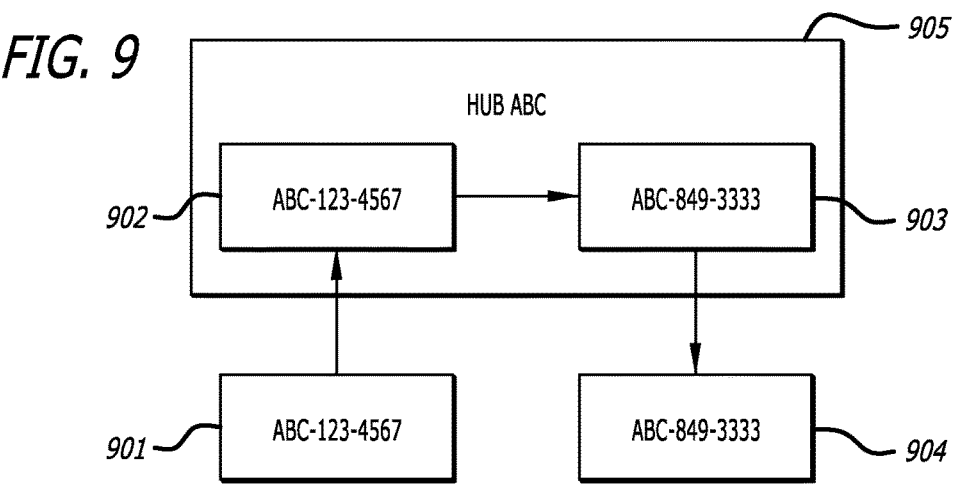
FIG. 9 is a graphical representation illustrating the operation of one embodiment of the invention utilizing a single OTP Hub server.
Figure 10:
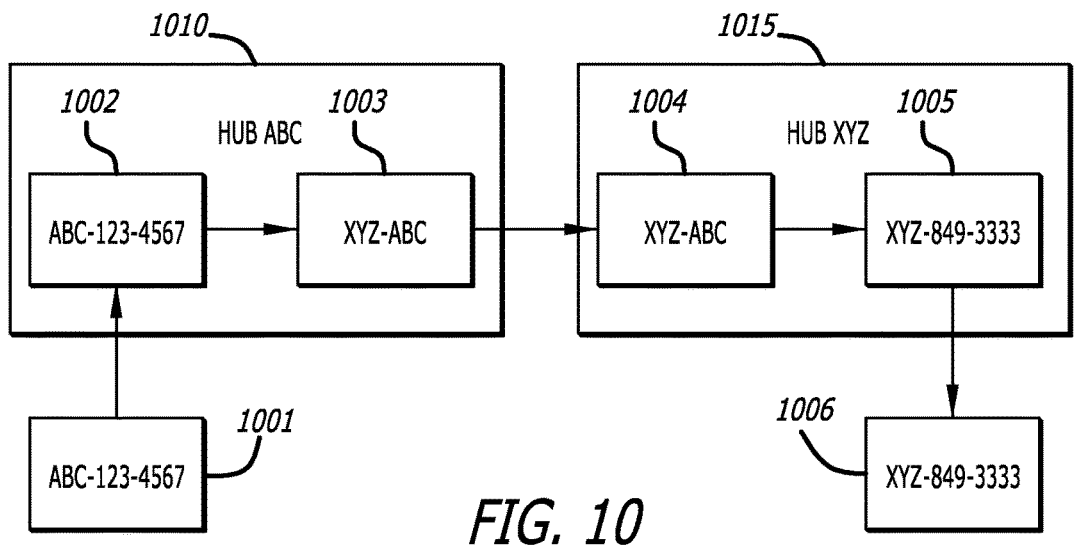
FIG. 10 is a graphical representation illustrating the operation of one embodiment of the invention utilizing one OTP Hub server associated with a sender different OTP Hub server associated with an intended recipient of the OTP Message.

The relay process is illustrated in FIGS. 9 and 10. FIG. 9 illustrates the transmission of an OTP Message from a sender 901 to a recipient 904 through a single OTP Hub 905. The sender uploads a message to the OTP Hub 905 where it is decrypted with that OTP Hub's copy of the sender's pad 902 and then re-encrypted with the OTP Hub's copy of the destination's pad 903. The destination (recipient 904) downloads the message and decrypts it.

In FIG. 10, sender 1001, addresses a message to a client 1006 of a different OTP Hub. The sender uploads a message to a first OTP Hub 1010 (the sender's primary OTP Hub that has the only other copy of their one-time pad data) where it is decrypted with the first OTP Hub's copy of the sender's pad 1002. The first OTP Hub 1010 determines the identity of the OTP Hub 1015 that hosts the destination's OT pad 1005. The sender's OTP Hub re-encrypts the message using a one-time pad 1003 that is shared only with the OTP Hub associated with the recipient, the destination OTP Hub, and transmits it to the destination OTP Hub 1015. At the destination OTP Hub, the message is decrypted using OT pad 1004 and re-encrypted with that OTP Hub's copy of the recipients OT pad 1005. The encrypted message is then downloaded and decrypted by the original intended recipient 1006.

Figure 11:
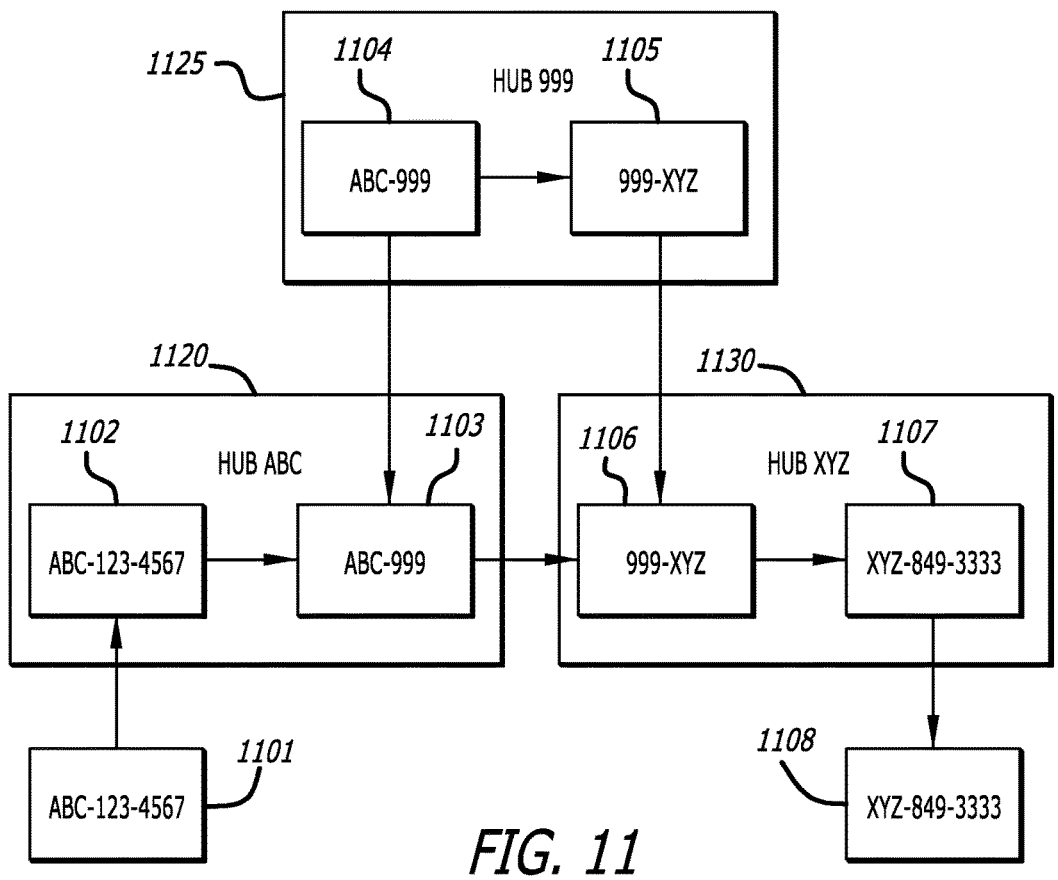
FIG. 11 is a graphical representation illustrating the operation of an embodiment of the invention utilizing a third OTP Hub server to relay a message from a sender's OTP Hub server to a recipient's OTP Hub server.

In FIG. 11, a sender 1101 uploads a message to an OTP Hub 1120 where it is decrypted using that OTP Hub's copy of the sender's OT pad 1102. The original OTP Message of the original sender is then re-encrypted using a pad 1103, 1104 shared by that OTP Hub and a central OTP Hub 1125. At the central OTP Hub the original OTP Message is decrypted using pad 1104 (which is a copy of pad 1103) then re-encrypted using an OT pad 1105, 1106 shared by the central OTP Hub 1125 and OTP Hub 1130 associated with the recipient 1108. When the original OTP Message is received at the destination OTP Hub 1130, it is decrypted using OT pad 1106, which is a copy of OT pad 1105, and re-encrypted using that OTP Hub's copy of the copy of the recipient's OT pad 1107. The recipient destination downloads the original OTP Message and decrypts it using the recipient's 1008 OT pad.

Islands of Trust

The method of relaying OTP Messages from OTP Hub to OTP Hub makes possible yet another innovation embodied in the systems and methods of the present invention. In one alternative embodiment of the one-time pad messaging system here disclosed, users may trust the security of their communications only if they trust the integrity and competence of whatever organization which hosts the OTP Hub through which they communicate. No organization is universally trusted and so different users will want their OTP Hubs operated by different entities. Competing companies or nations will want to operate separate OTP Hubs to propagate their internal OTP Hub communications.

At the same time it is also the case that individuals may wish to sometimes communicate with individuals who lie outside their circle of trust. A system of OTP Hub relays can resolve this problem by allowing the OTP Hubs servicing two individuals to communicate with each other or through a third OTP Hub. This mechanism allows users to build bridges between the "islands of trust" that comprise their local OTP Hubs.

An ideal one-time pad messaging system consists of a system of OTP Hubs provisioned with one-time pad data pads that would allow each OTP Hub to securely communicate with every other either directly or by relay allowing every OTP Message originator user to communicate with every other.

As disclosed above, all a sender needs to know to send an OTP Message to a recipient destination is the recipient destination's OTP Address. It is a further innovation of the invention here disclosed that the format of these OTP Addresses may incorporate an element by which the sender, or the sender's first OTP Hub, could identify the OTP Hub to which the destination address subscribes. One analogy of such a system is the use of an area code in a telephone number. This identifier allows the sender to determine whether to trust communications with this source. This system of identification is illustrated in FIGS. 9-11 where the identification of OTP Hubs is incorporated into the sender's and recipient's OTP Addresses.

In another embodiment, a service incorporating one or more embodiments of the present invention may allow senders the option of instructing the OTP Hub to publish their OTP Message on widely available public web sites, identified there only with the address of the intended destination. Anyone could download the message, but only the destination with the one-time pad data corresponding to that addressee could decrypt the message. This allows recipients to collect their inbound messages anonymously using ordinary web browsers.

Email Routing

In another embodiment, the software application described previously may allow users to append or embed OTP Messages in emails. The emails could then be sent to an email address associated with the OTP Hub service, or could be sent to third parties to forward to the OTP Hub service email address. Once received, the OTP Hub service treats the message as it would any message that had been directly uploaded.

Figure 13:
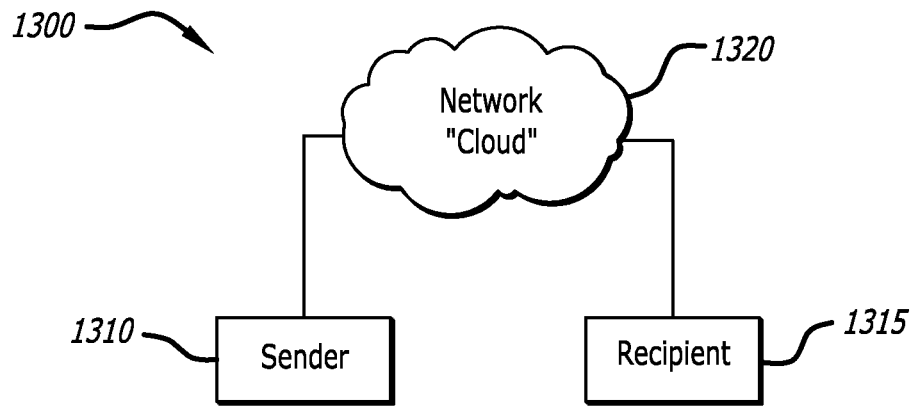
FIG. 13 is a graphical representation of an OTP system in accordance with one embodiment of the present invention.

FIG. 13 is a graphical representation of an exemplary embodiment of the above described system 1300 wherein a sender 1310, who typically uses a computer, tablet, lap-top, smart phone or other suitable enabled communication device, communicates to a server included in a "cloud" network 1320. The server in the cloud network may serve as the OTP Hub. One or more recipients 1315 may also be in communication with the server in the network cloud 1320, and thus may exchange messages with sender 1310 through the OTP Hub on the server in the cloud network using the various embodiments of the encryption/decryption system and methods described above.

Figure 14:
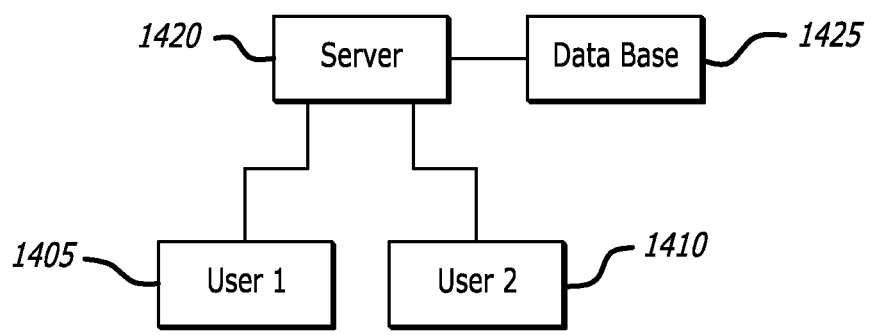
FIG. 14 is a graphical representation of an OTP system in accordance with another embodiment of the present invention.

FIG. 14 is a graphical representation of another exemplary embodiment of the above described system wherein user1 1405 may exchange messages with user2 1410 through server 1420. Server 1420 may be operated in accordance with appropriate software commands to carry out the functions described above in reference to the various embodiments of the system and method of the present invention. In this embodiment, the server 1420 is in communication with a database 1425, in which may be stored data related to one or more one-time pads, as well as other information, content, or data necessary to the operation of the embodiments of the system and method of the present invention.

The various embodiments of the present invention may be implemented by computers organized in a conventional distributed processing system architecture. For example, a typical computer system includes a bus or other communication mechanism for communicating information, and a processor coupled with bus for processing information. Computer system also includes a main memory, such as a random access memory (RAM) or other dynamic storage device, coupled to the bus for storing information and instructions to be executed by the processor. RAM also may be used for storing temporary variables or other intermediate information during execution of instructions to be executed by the processor. The computer system may further include a read only memory (ROM) or other static storage device coupled to the bus for storing static information and instructions for the processor. A storage device, such as a magnetic disk or optical disk, may also be provided and coupled to the bus for storing information and instructions.

The computer system may be coupled via the bus to a display, such as a cathode ray tube (CRT), for displaying information to a computer user. An input device, including alphanumeric and other keys, is typically coupled to the bus for communicating information and command selections to the processor. Another type of user input device, such as a mouse, a trackball or cursor direction keys for communicating direction information and command selections to the processor and for controlling cursor movement on the display.

The invention is related to the use of the computer system by a user for accessing the one-time pad messaging services stored on an OTP Hub server. The OTP Hub server typically includes, like the computer, a processor, a memory, and may also include one or more alternative forms of memory or storage, along with suitable communication circuitry so as to be able to communicate, either wired or wirelessly, with the computer. Information, data, and commands are processed by the computer and the OTP Hub server by executing one or more sequences of one or more instructions contained in the memory of either the computer or OTP Hub server. Such instructions may be read into memory of the server or computer from another computer-readable medium, such as storage device. Execution of the sequences of instructions contained in the memory causes the processor of the computer or OTP Hub server to perform the process steps described herein. In an alternative implementation, hard-wired circuitry may be used in place of or in combination with software instructions to implement the invention. Thus implementations of the invention are not limited to any specific combination of hardware circuitry and software.

The term "computer-readable medium" as used herein refers to any media that participates in providing instructions to any processor for execution. Such a medium may take many forms, including but not limited to, non-volatile media, volatile media, and transmission media. Non-volatile media includes, for example, optical or magnetic disks, or a secure storage device such as a portable storage device, which may include portable hard drives, optical discs, or devices known as "thumb" drives. Volatile media includes dynamic memory. Transmission media includes coaxial cables, copper wire and fiber optics, including the wires that comprise the bus. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, papertape, any other physical medium with patterns of holes, a RAM, PROM, and EPROM, a FLASH-EPROM, any other memory chip or cartridge, a carrier wave as described hereinafter, or any other medium from which a computer can read.

The computer system used by a user of the invention may also include a communication interface coupled to the bus. The communication interface provides a two-way data communication coupling to a network link that is connected to local network, WLAN, Internet, or other network. For example, communication interface may be an integrated services digital network (ISDN) card or a modem to provide a data communication connection to a corresponding type of telephone line. As another example, communication interface may be a local area network (LAN) card to provide a data communication connection to a compatible LAN. Wireless links may also be implemented. In any such implementation, communication interface sends and receives electrical, electromagnetic or optical signals that carry digital data streams representing various types of information.

The network link typically provides data communication through one or more networks to other data devices. For example, the network link may provide a connection through a local network to the OTP Hub server which may be located remote from the user's computer, including a hub server located in the "cloud." Where the server is located remotely from the user's computer, the network link may alternatively include a link to data equipment operated by an Internet Service Provider (ISP). The ISP in turn provides data communication services through the Internet. The local network and Internet both use electric, electromagnetic or optical signals that carry digital data streams. The signals through the various networks and the signals on network link and through communication interface, which carry the digital data to and from the computer system, are exemplary forms of carrier waves transporting the information.

Although the computer system may be connected to one server, those skilled in the art will recognize that the computer system may establish connections to multiple servers through the Internet. Each such server may also include an HTML-based Internet application, which may provide information to the computer system upon request in a manner consistent with the present invention. The various operations described above embodying the invention may be carried out between a user's computer system and the OTP Hub server using HTML protocols and commands. Those skilled in the art will understand that the various embodiments of the invention are not limited to using any specific communication protocol to affect transmission of OTP Messages. For example, but not limited to, an OTP systems as described herein may communicate, transmit and/or route encrypted one-time-pad messages by the SMTP, ESMTP, e-mail, sms, http, https, tc/ip, SOAP, REST, HTML web socket, SLS, TLS, UDP or IRC, RIP, RIP2, IGRP, EIGRP, OSPF, BPG transport protocols singly or in combination.

While various embodiments of the system and methods of the present invention have been described, it will be appreciated that other embodiments are also intended to be within the scope of this disclosure. For example, one intended embodiment is a system that includes a system for encrypting and transmitting messages from senders to recipients employing one-time pad encryption, comprising: one or more processors and/or servers, memories and communication means, such as connections to other processors and servers through a network, such as a LAN or the Internet, or through other communications means such as wired or wirelessly, telephone lines and the like, the processor or processors or servers programmed using software instructions for: creating sets of true random data, each set of data being unique, storing one copy of each data set in a manner accessible by a server configured as a communications OTP Hub and distributing one other copy to each communicant to be used as a one-time pad encryption key; systems or processes for each sender to encrypt messages using said one-time pad data using the method of one-time pad encryption; system or processes for the sender to transmit the messages to the OTP Hub; systems and processes at the OTP Hub to decrypt said messages using the OTP Hub's copy of the sender's one-time pad; systems and processes at the OTP Hub to re-encrypt a message using the OTP Hub's copy of a recipient's one-time pad data key; systems and processes at the OTP Hub to transmit encrypted messages to a recipient; systems and processes at the recipient, to receive the messages; and systems and processes at the recipient. to decrypt the message using the recipient's one time pad data key.

In some embodiments, the system and processes for encrypting include a process for a sender to compose a message, and a process for the sender to encrypt data files and include these as parts of a message. In other embodiments, the system and process for decrypting includes a process for a sender to read a message. In other embodiments, the system and process for decrypting includes a process for the sender to decrypt copies of files included in a message.

In still another embodiment, the system and method includes a process for associating a unique alpha-numeric number with each particular one-time-pad data set stored at the OTP Hub, allowing the unique alpha numeric number to be used as a destination address of a message. In another embodiment, the destination address or addresses transmitted from the sender to the OTP Hub are transmitted encrypted.

Another embodiment includes a process whereby a sender may record a numeric pointer to a position in that portion of one-time pad data which has not been previously used to encrypt any sent message, and also including a process for transmitting information delimiting that portion of the sender's one-time pad data used to encrypt the message as part of the message.

In another embodiment, the various processes carried out by the software application and server may include processes for storing sent messages or received messages in storage devices separate from those which store one time pad data. Some embodiments may also include systems or processes allowing recipients to view messages in at least some file formats without creating an unencrypted copy on any local storage device. Various embodiments may also include systems or processes allowing senders to compose and transmit messages without creating any unencrypted copy of the message on local storage. In other embodiments, the sender may instruct the recipient's decrypting application not to store the message in decrypted form at the recipient's machine. Many other embodiments may also be configured to allow recipients to forward received messages to other destination addresses, and also to allow recipients to reply to the destination address of the sender of the message.

As discussed above, the OTP Hub may be implemented on a server. It will be understood that a server is not necessarily one physical device, but may include distributed systems having more than one processor and associate memory. Various OTP Hubs may be implemented on a single physical device, or they may be implemented on physically separated devices.

In still another embodiment, the system and method may include using one or more servers remote from the OTP Hub to transmit automatically generated messages to mask the sending and receiving activities of communicants using the various embodiments of the system and methods of the present invention. In yet another embodiment, an OTP Hub may be configured or programmed to push messages to recipients message client software and/or to process and transmit OTP Message that may be of any electronic data structure or format, such as video, sound, text, image, or database file.

In a further embodiment, the present invention may include systems and methods in which OTP Hub is configured or programmed to include additional indicators into the message (thus altering the message itself) such that in the transmission of the message to the recipient, it is a message that include other information that the OTP Hub service is set to include in all or some OTP Messages for delivery, or some indicator that the sender opted to have included, for example, a response mechanism such that the OTP Hub is aware of when the message has been decrypted at the recipient, or the recipient can take an action against an indicator placed in the OTP Message by the OTP Hub so the OTP Hub receives the indication of for example, the decryption, reading, acknowledgement of understanding, or other, by the recipient. The OTP Hub may generate a system message that makes available this information, indicator, a first information related to, or a representation of this indication of, for example, decryption, reading, understanding by the recipient, to the sender.

In another further embodiment, the OTP Message may include information including a preferred OTP Hub address or routing to that Hub that can be changed by the sender if necessary. In other embodiments, the OTP Hub may be programmed or configured to include or access a remote database of addresses associated with recipient pads, relay OTP Hubs with the remote database or addresses acting as a centralized directory of addresses that can be polled by authorized OTP Hubs.

In yet another further embodiment, the server or processor of an OTP Hub may be configured or programmed to enable an OTP Hub to be disabled by an OTP Hub administrator with a system message transmitted to all OT pad holders, with the system message that the messaging user interface software of the OT pad holders can recognize as being an authentic system message.

In still another embodiment, the SD may include a pre-loaded and suppressed system message may be loaded within a messaging user interface software of the OT pad holders. This message may be displayed a new OT pad is first connected with the messaging user interface software of the OT pad holders. In another embodiment, this suppressed system message can be triggered to be revealed within the messaging user interface software of the OT pad holders upon the OTP Hub sending a set of data from a system message area OT pad of the senders included in the copy of the OT pad stored at the OTP Hub, such as, for example, if an OTP Hub security suffers a security breach, the OTP Hub administrator shuts down the OTP Hub, or the OTP Hub needs to be replaced, each holder of the OT pad associated with that OTP Hub will have a pre-set system message become revealed within their messaging user interface software of the OT pad. This is triggered by a set of data being received from the OTP Hub, and will be revealed in a part of the messaging user interface used for system messages so that the OT pad holder can verify as authentic. In other embodiments, this process may be facilitated by The OTP Hub and OT pads having a partition of data reserved for system messages, and a method for triggering a system message using data from a pre-determined location within the system message partition.

In another embodiment, the OT pads may be distributed to users of the OTP Service via a method that is not associated with billing or personally identifiable information of the users of the OT pad, In this way, the OT pad identifier may be anonymous, thereby making the "from" senders and "to" recipients anonymous to a party that might intercept a message in route, or to a recipient that may read a message (received or posted to a public web site or application) from an anonymous sender, that has only the recipient OTP address or address of the public web site or application that allows for receiving and posting of such OTP Messages.

In still other embodiments, the systems and methods of the present invention may include enabling the installation or pre-installation of OT pads within third party messaging or communications devices or other software pre-installed on such devices.

While several particular forms of the invention have been illustrated and described, it will be apparent that various modifications can be made without departing from the spirit and scope of the invention.

I claim:

1. A system for enabling a plurality of users to mutually exchange messages through a server (HUB) providing one time pad encryption for each message on each leg of its transmission through a one-time pad network, comprising:

the HUB including a computing device, a memory, and a data base;

a plurality of computing devices (TRANSCEIVERS) and associated memories, each of the TRANSCEIVERS programmed using software commands to send and receive data through the one-time pad network, each of the TRANSCEIVERS being associated with a unique NETWORK ADDRESS;

a plurality of pairs of unique random data sets (PADS), each pair of PADS being unique and associated with a PAD IDENTIFIER, the PAD IDENTIFIER of each pair of PADS being stored in the database of the HUB in association with the NETWORK ADDRESS associated with the TRANSCEIVER device in which the first PAD of the pair of PADS is stored, each PAD of the pair of PADS having a first partition for encrypting outbound messages and a second partition for decrypting received messages;

wherein a sending TRANSCEIVER is further configured using software commands to:

accept data input into an input interface to compose a message for transmission to one or more recipient TRANSCEIVERS, accept data input representative of the NETWORK ADDRESS of each intended recipient to the message, and add the NETWORK ADDRESS to the message to create an ENCRYPTION PACKAGE, store in the memory of the sending TRANSCEIVER an ENCRYPTION POINTER created by the sending TRANSCEIVER identifying the position of the first byte (the INITIAL VALUE) in the encrypting data set at which encryption of the message was initiated, encrypt the ENCRYPTION PACKAGE using a decrementing data set for outbound messages by encrypting each ENCRYPTION PACKAGE byte by modular addition with successive bytes of the random data from the first partition of the PAD stored on the sending TRANSCEIVER, store a value of the ENCRYPTION POINTER in the memory of the sending TRANSCEIVER, increment the ENCRYPTION POINTER with each byte of the random data from the first partition of the PAD used, erase bytes in the encrypting data set which were used for encryption of the ENCRYPTION PACKAGE, update the local copy of the ENCRYPTION POINTER stored in the sending TRANSCEIVER's memory, generate an EXTENSION having a pseudo-random number of pseudo-random bytes to mask the ENCRYPTED PACKAGE's true length, append the EXTENSION to the ENCRYPTION PACKAGE, and transmit a TRANSMISSION PACKAGE consisting of the ENCRYPTION PACKAGE and the appended EXTENSION, the sending TRANSCEIVER's PAD IDENTIFIER, and the initial value of the ENCRYPTION POINTER to the HUB;

wherein the computing device of the HUB is further configured using software commands to receive the TRANSMISSION PACKAGE, identify from the TRANSMISSION PACKAGE the TRANSCEIVER PAD IDENTIFIER and the HUB's copy of the PAD pair used by the sending TRANSCEIVER to encrypt the ENCRYPTION PACKAGE, decrypt the ENCRYPTION PACKAGE, using the first partition of the copy of the sending TRANSCEIVER's PAD pair stored in the memory of the HUB, each byte of the encrypted ENCRYPTION PACKAGE decrypted by performing modular addition with successive bytes beginning at the location in the PAD pointed to by the received ENCRYPTION POINTER, discard that portion of the TRANSMISSION PACKAGE consisting of the EXTENSION, erase each byte in the copy of the PAD stored in the memory of the HUB which has been used for decryption of the ENCRYPTION PACKAGE, identify the recipient NETWORK ADDRESS OR NETWORK ADDRESSES included in the ENCRYPTION PACKAGE, retrieve, from the HUB's database, the PAD IDENTIFIER of the receiver's PAD data set corresponding to each NETWORK ADDRESS to which the MESSAGE is addressed for each PAD, retrieve from the HUB's database the location of the first byte in the retrieved data set which has not been previously used for encryption (the DECRYPT POINTER) and, store the INITIAL LOCATION of the DECRYPT POINTER in the memory of the HUB, encrypt the MESSAGE using a decrementing data set for outbound messages by encrypting each MESSAGE byte by modular addition with successive bytes of the random data in the portion of the PAD pair partitioned for decryption associated with the receiving TRANSCEIVER beginning with the INITIAL LOCATION of the DECRYPT POINTER and incrementing the DECRYPT POINTER with each byte used, erase each byte in the encrypting data set which has been used for encryption of the MESSAGE by the HUB, generate a SECOND EXTENSION having a pseudo-random number of pseudo-random bytes to mask the MESSAGE's true length, append the SECOND EXTENSION to the MESSAGE to create a DOWNLOAD PACKAGE, update the local copy of the DECRYPT POINTER stored in the HUB database, and transmit the encrypted data of the DOWNLOAD PACKAGE and the INITIAL POSITION of the DECRYPT POINTER to the receiving TRANSCEIVER; and wherein, the receiving TRANSCEIVER is configured by software commands to receive the DOWNLOAD PACKAGE and the INITIAL POSITION of the DECRYPT POINTER, decrypt the DOWNLOAD PACKAGE, using the receiving TRANSCEIVER's copy of the second partition of the receiving TRANSCEIVERs PAD used by the HUB for encryption to decrypt each byte of the encrypted message by performing modular addition with successive bytes, beginning at the location designated by the received DECRYPT POINTER, in the portion of the receiving TRANSCEIVER's PAD designated for decryption, erase each byte in the second partition of the copy of the PAD stored in the memory of the receiving TRANSCEIVER which has been used for decryption of the MESSAGE, and display the decrypted MESSAGE at the receiving TRANSCEIVER.

2. The system of claim 1, wherein the computing device of the HUB is configured using software commands to store outbound and received messages in the HUB's memory.

3. The system of claim 1, wherein the receiving TRANSCEIVER is configured by software commands to store a message and its attachment(s) in unencrypted form to a memory associated with the-receiving TRANSCEIVER—if the message is not marked "eyes only".

4. The system of claim 1, wherein the computing device is configured to perform its operations without utilizing any form of temporary files or caching.

5. The system of claim 1, wherein the message received from the sender includes encrypted data files.

6. The system of claim 1, wherein the PAD IDENTIFIER associated with each pair of PADS is a unique alpha-numeric number.

7. The system of claim 1, further comprising, at the OTP HUB, record and store a numeric pointer to the portion of the PAD assigned to the recipient which has not been used to encrypt messages for the recipient.

8. The system of claim 7, further comprising transmit to the recipient information delimiting that portion of the PAD assigned to the recipient used to encrypt the message as part of the message transmitted to the recipient.

9. The system of claim 1, further comprising including, at the OTP HUB, in the message a message authentication code comprising a hash or check-sum of at least some portion of the transmitted message.

10. A method for encrypting and transmitting messages from senders to recipients employing one-time pad encryption, comprising:
   associating a unique NETWORK ADDRESS to a plurality of computing devices (TRANSCEIVERS) and associated memories, each of the TRANSCEIVERS programmed using software commands to send and receive data through a one-time pad network;
   storing a plurality of pairs of unique random data sets (PADS) in a database in communication with a HUB, the HUB including a computing device a HUB memory, each pair of PADS being unique and associated with a PAD IDENTIFIER,
   storing the PAD IDENTIFIER of each pair of PADS in the database in association with the NETWORK ADDRESS associated with the TRANSCEIVER device in which the first PAD of the pair of PADS is stored, each PAD of the pair of PADS having a first partition for encrypting outbound messages and a second partition for decrypting received messages;
   accepting data input into an input interface of a sender TRANSCEIVER to compose a message for transmission to one or more recipient TRANSCEIVERS;
   accepting data input representative of the NETWORK ADDRESS of each intended recipient to the message, and adding the NETWORK ADDRESS to the message to create an ENCRYPTION PACKAGE;
   storing in the memory of the sending TRANSCEIVER an ENCRYPTION POINTER created by the sending TRANSCEIVER identifying the position of the first byte (the INITIAL VALUE) in the encrypting data set at which encryption of the message was initiated;
   encrypting the ENCRYPTION PACKAGE using a decrementing data set for outbound messages by encrypting each ENCRYPTION PACKAGE byte by modular addition with successive bytes of the random data from the first partition of the PAD stored on the sending TRANSCEIVER;
   storing a value of the ENCRYPTION POINTER in the memory of the sending TRANSCEIVER;
   incrementing the ENCRYPTION POINTER with each byte of the random data from the first partition of the PAD used;
   erasing bytes in the encrypting data set which were used for encryption of the ENCRYPTION PACKAGE;
   updating the local copy of the ENCRYPTION POINTER stored in the sending TRANSCEIVER's memory;
   generating an EXTENSION having a pseudo-random number of pseudo-random bytes to mask the ENCRYPTED PACKAGE's true length;
   appending the EXTENSION to the ENCRYPTION PACKAGE, and
   transmitting a TRANSMISSION PACKAGE consisting of the ENCRYPTION PACKAGE and the appended EXTENSION, the sending TRANSCEIVER's PAD IDENTIFIER, and the initial value of the ENCRYPTION POINTER to the HUB;
   receiving the TRANSMISSION PACKAGE by the HUB, and, by the HUB,
      identifying from the TRANSMISSION PACKAGE the TRANSCEIVER PAD IDENTIFIER and the HUB's copy of the PAD pair used by the sending TRANSCEIVER to encrypt the ENCRYPTION PACKAGE,
      decrypting the ENCRYPTION PACKAGE, using the first partition of the copy of the sending TRANSCEIVER's PAD pair stored in the memory of the HUB, each byte of the encrypted ENCRYPTION PACKAGE decrypted by performing modular addition with successive bytes beginning at the location in the PAD pointed to by the received ENCRYPTION POINTER,
      discarding that portion of the TRANSMISSION PACKAGE consisting of the EXTENSION,
      erasing each byte in the copy of the PAD stored in the memory of the HUB which has been used for decryption of the ENCRYPTION PACKAGE,
      identifying the recipient NETWORK ADDRESS OR NETWORK ADDRESSES included in the ENCRYPTION PACKAGE,
      retrieving, from the HUB's database, the PAD IDENTIFIER of the receiver's PAD data set corresponding to each NETWORK ADDRESS to which the MESSAGE is addressed for each PAD,
      retrieving from the HUB's database the location of the first byte in the retrieved data set which has not been previously used for encryption (the DECRYPT POINTER),
      storing the INITIAL LOCATION of the DECRYPT POINTER in the memory of the HUB,
      encrypting the MESSAGE using a decrementing data set for outbound messages by encrypting each MESSAGE byte by modular addition with successive bytes of the random data in the portion of the PAD pair partitioned for decryption associated with the receiving TRANSCEIVER beginning with the INITIAL LOCATION of the DECRYPT POINTER and incrementing the DECRYPT POINTER with each byte used,
      erasing each byte in the encrypting data set which has been used for encryption of the MESSAGE by the HUB,
      generating a SECOND EXTENSION having a pseudo-random number of pseudo-random bytes to mask the MESSAGE's true length,
      appending the SECOND EXTENSION to the MESSAGE to create a DOWNLOAD PACKAGE, updating the local copy of the DECRYPT POINTER stored in the HUB database, and transmitting the encrypted data of the DOWNLOAD PACKAGE and the INITIAL POSITION of the DECRYPT POINTER to the receiving TRANSCEIVER; and receiving by the receiving TRANSCEIVER, the DOWNLOAD PACKAGE and the INITIAL POSITION of the DECRYPT POINTER, and, by the receiving TRANSCEIVER, decrypting the DOWNLOAD PACKAGE, using the receiving TRANSCEIVER's copy of the second partition of the receiving TRANSCEIVERs PAD used by the HUB for encryption to decrypt each byte of the encrypted message by performing modular addition with successive bytes, beginning at the location designated by the received DECRYPT POINTER, in the portion of the receiving TRANSCEIVER's PAD designated for decryption, erasing each byte in the second partition of the copy of the PAD stored in the memory of the receiving TRANSCEIVER which has been used for decryption of the MESSAGE, and displaying the decrypted MESSAGE at the receiving TRANSCEIVER.

11. The method of claim 10, wherein each one-time pad includes a portion used for encrypting sent messages and a portion used for decrypting received messages.

12. The method of claim 10, further comprising storing, at the OTP HUB, transmitted and received messages in storage devices separate from those which store PADS.

13. The method of claim 10, further comprising transmitting the encrypted message from the OTP HUB through a server remote from the HUB to relay the encrypted message to the recipient.

14. The method of claim 10, further comprising transmitting automatically generated messages to mask the sending and receiving activities of senders and recipients by the OTP HUB through servers remote from the OTP HUB.

15. The method of claim 10, further comprising transmitting to sender by the OTP HUB, an indication that the encrypted message transmitted from the OTP HUB to the recipient has been queued for download by the recipient.

16. The method of claim 10, further comprising transmitting to sender by the OTP HUB, an indication that the encrypted message transmitted from the OTP HUB to the recipient has been delivered to the recipient.

17. The method of claim 10, pushing, by the OTP HUB, messages to recipient's message client software.

18. The method of claim 10, wherein the message received from the sender includes any electronic data structure or format, including one or more video, sound, text, image, or database files.

19. The method of claim 10, further comprising, transmitting by the OTP HUB an indication, selected from the list consisting of an that a received message is able to be decrypted and/or re-encrypted), an indication that the received message cannot be decrypted and/or encrypted, an indication that the received message has been decrypted and re-encrypted, or an indication has been made available for recipient pick up and/or transmitted to recipient, to the sender.

20. The method of claim 10, wherein the one-time pads include a portion dedicated to system messages provided by the OTP HUB.

21. The method of claim 10, where further comprising including an address of an OTP HUB to be used to transmit the encrypted message to the recipient.

22. The method of claim 10, further comprising accessing, by the OTP HUB, a remote database of addresses associated with recipient PADS and relay OTP HUBS, the remote database of addresses acting as a centralized directory of addresses that can be polled by the OTP HUB.

* * * * *